US011099853B2

United States Patent
Lichtenau et al.

(10) Patent No.: US 11,099,853 B2
(45) Date of Patent: Aug. 24, 2021

(54) DIGIT VALIDATION CHECK CONTROL IN INSTRUCTION EXECUTION

(71) Applicant: INTERNATIONAL BUSINESS MACHINES CORPORATION, Armonk, NY (US)

(72) Inventors: Cedric Lichtenau, Stuttgart (DE); Reid Copeland, Ontario (CA); Petra Leber, Ehningen (DE); Silvia M. Mueller, Altdorf (DE); Jonathan D. Bradbury, Poughkeepsie, NY (US); Xin Guo, Toronto (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/277,486

(22) Filed: Feb. 15, 2019

(65) Prior Publication Data

US 2020/0264890 A1    Aug. 20, 2020

(51) Int. Cl.
*G06F 16/2457* (2019.01)
*G06F 7/48* (2006.01)
(Continued)

(52) U.S. Cl.
CPC ........ *G06F 9/3857* (2013.01); *G06F 9/30145* (2013.01); *G06F 9/3826* (2013.01)

(58) Field of Classification Search
CPC .......................... G06F 9/3857; G06F 9/30145
See application file for complete search history.

(56) References Cited

U.S. PATENT DOCUMENTS 5,640,503 A * 6/1997 Alpert ................. G06F 9/30076
                                                    712/227
5,761,474 A * 6/1998 Lesartre ................ G06F 9/3836
                                                    712/216
(Continued)

FOREIGN PATENT DOCUMENTS

EP    745931 A1    12/1996

OTHER PUBLICATIONS

Mell, Peter, et al., "The NIST Definition of Cloud Computing", NIST Special Publication 800-145, Sep. 2011, Gaithersburg, MD, 7 pgs.

(Continued)

*Primary Examiner* — Hyun Nam
(74) *Attorney, Agent, or Firm* — Steven Chiu; Matthew M. Hulihan; Heslin Rothenberg Farley & Mesiti PC

(57) ABSTRACT

Digit validation check control for execution of an instruction. A process obtains an instruction to perform operation(s) using input value(s). The instruction includes a no validation indicator for controlling whether digit validation check control is enabled for execution of the instruction. The process executes the instruction, including determining, based on the no validation indicator, whether digit validation check control is enabled for execution of the instruction, and performing processing based on the determining. Based on the no validation indicator being set to a defined value, digit validation check control is enabled and the processing includes forcing a digit check error indicator output by the executing to indicate no digit check error with respect to the at least one input value.

20 Claims, 12 Drawing Sheets

(51) Int. Cl.
*G06F 9/38* (2018.01)
*G06F 9/30* (2018.01)

(56) References Cited

U.S. PATENT DOCUMENTS

| | | | |
|---|---|---|---|
| 5,836,014 A | 11/1998 | Faiman | |
| 6,178,495 B1* | 1/2001 | Siegel | G06F 9/30145 |
| | | | 712/206 |
| 6,862,565 B1 | 3/2005 | Zheng | |
| 6,970,898 B2 | 11/2005 | Steele, Jr. | |
| 7,543,007 B2 | 6/2009 | Iacobovici | |
| 8,856,759 B2 | 10/2014 | Guenthner et al. | |
| 9,218,171 B2 | 12/2015 | Kawahito | |
| 9,329,861 B2 | 5/2016 | Carlough et al. | |
| 9,335,993 B2 | 5/2016 | Carlough et al. | |
| 9,940,182 B1 | 4/2018 | Stott | |
| 2003/0005012 A1 | 1/2003 | Steele | |
| 2003/0126173 A1 | 7/2003 | Steele, Jr. | |
| 2006/0179104 A1 | 8/2006 | Steele, Jr. | |
| 2007/0043796 A1 | 2/2007 | Iacobovici | |
| 2007/0112998 A1 | 5/2007 | Peri et al. | |
| 2010/0262813 A1* | 10/2010 | Brown | G06F 9/30058 |
| | | | 712/240 |
| 2011/0191755 A1 | 8/2011 | Guenthner et al. | |
| 2013/0166952 A1* | 6/2013 | Schon | G06F 11/0736 |
| | | | 714/23 |
| 2013/0173892 A1 | 7/2013 | Carlough et al. | |
| 2013/0238680 A1 | 9/2013 | Atsumi | |
| 2014/0149722 A1* | 5/2014 | Brown | G06F 9/3017 |
| | | | 712/226 |
| 2014/0181481 A1 | 6/2014 | Cowlishaw et al. | |
| 2016/0062752 A1 | 3/2016 | Kawahito | |
| 2016/0092164 A1 | 3/2016 | Bradbury et al. | |
| 2016/0092165 A1 | 3/2016 | Bradbury et al. | |
| 2016/0378485 A1* | 12/2016 | Gschwind | G06F 9/30025 |
| | | | 712/226 |
| 2018/0095727 A1 | 4/2018 | Bradbury et al. | |
| 2020/0264890 A1* | 8/2020 | Lichtenau | G06F 9/3826 |

OTHER PUBLICATIONS

Z/Architecture Principles of Operation, IBM Publication No. SA22-7832-11, 12th edition, Sep. 2017.
List of IBM Patents or Applications Treated as Related, Feb. 20, 2019, 2 pgs.
"Negative Zero Control in Instruction Execution", U.S. Appl. No. 16/277,446, filed Feb. 15, 2019, pp. 1-63.
International Search Report and Written Opinion for PCT/EP2020/051864 completed Apr. 1, 2020, 8 pgs.
International Search Report and Written Opinion for PCT/IB2020/050594 completed May 21, 2020, 7 pgs.
The Decimal Floating Point Standard, Jan. 2018, retrieved on [Aug. 19, 2020]. Retrieved from the Internet <http://www.quadibloc.com/comp/cp020302.htm> (Year: 2018), 7 pgs.

* cited by examiner

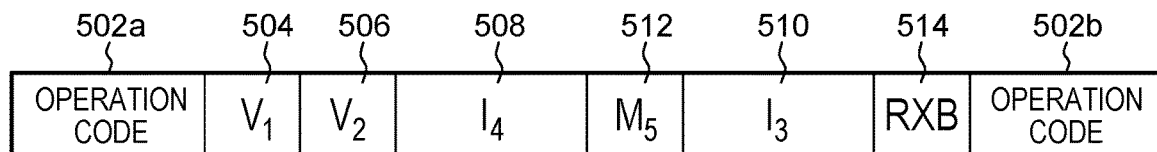

| 502a | 504 | 506 | 508 | 512 | 510 | 514 | 502b |
|---|---|---|---|---|---|---|---|
| OPERATION CODE | $V_1$ | $V_2$ | $I_4$ | $M_5$ | $I_3$ | RXB | OPERATION CODE |

FIG. 5A

| Sign Operation (SO) | Result Magnitude (after RDC applied) | $V_2$ Sign | Positive sign Code (PC) | Negative Zero (NZ) | V2 Sign Code Validity Check | V2 Digit Code Validity Check perform if... | Result Sign Code (hex) | Condition Code[d] |
|---|---|---|---|---|---|---|---|---|
| 520 | 522 | 524 | 526 | 528 | 530 | 532 | 534 | 536 |
| 00 (maintain) | nonzero[a] | positive | 0 | = | NV=0 | NV=0 | C positive | 2 |
| 00 (maintain) | nonzero[a] | positive | 1 | = | NV=0 | NV=0 | F positive | 2 |
| 00 (maintain) | nonzero[a] | negative | = | = | NV=0 | NV=0 | D negative | 1 |
| 00 (maintain) | nonzero[a] | invalid[b] | = | = | NV=0 | NV=0 | 2nd operand sign | 2 |
| 00 (maintain) | zero[a] | positive | 0 | = | NV=0 | NV=0 | C positive | 0 |
| 00 (maintain) | zero[a] | positive | 1 | = | NV=0 | NV=0 | F positive | 0 |
| 00 (maintain) | zero[a] | negative | 0 | 0 | NV=0 | NV=0 | C positive | 0 |
| 00 (maintain) | zero[a] | negative | 1 | 0 | NV=0 | NV=0 | F positive | 0 |
| 00 (maintain) | zero[a] | negative | = | 1 | NV=0 | NV=0 | D negative | 0 |
| 00 (maintain) | zero[a] | invalid[b] | = | = | NV=0 | NV=0 | 2nd operand sign | 0 |
| 01 (complement) | nonzero[a] | positive | - | - | always | NV=0 | D negative | 1 |
| 01 (complement) | nonzero[a] | negative | 0 | - | always | NV=0 | C positive | 2 |
| 01 (complement) | nonzero[a] | negative | 1 | - | always | NV=0 | F positive | 2 |
| 01 (complement) | = | invalid[b] | = | = | always | NV=0 | -[c] | -[c] |
| 01 (complement) | zero[a] | positive | 0 | 0 | always | NV=0 | C positive | 0 |
| 01 (complement) | zero[a] | positive | 1 | 0 | always | NV=0 | F positive | 0 |
| 01 (complement) | zero[a] | positive | = | 1 | always | NV=0 | D negative | 0 |
| 01 (complement) | zero[a] | negative | 0 | = | always | NV=0 | C positive | 0 |
| 01 (complement) | zero[a] | negative | 1 | = | always | NV=0 | F positive | 0 |
| 10 (force positive) | nonzero[a] | - | 0 | - | SV=1 | NV=0 | C positive | 2 |
| 10 (force positive) | nonzero[a] | - | 1 | - | SV=1 | NV=0 | F positive | 2 |
| 10 (force positive) | zero[a] | - | 0 | - | SV=1 | NV=0 | C positive | 0 |
| 10 (force positive) | zero[a] | - | 1 | - | SV=1 | NV=0 | F positive | 0 |
| 11 (force negative) | nonzero[a] | - | - | - | SV=1 | NV=0 | D negative | 1 |
| 11 (force negative) | zero[a] | - | 0 | 0 | SV=1 | NV=0 | C positive | 0 |
| 11 (force negative) | zero[a] | - | 1 | 0 | SV=1 | NV=0 | F positive | 0 |
| 11 (force negative) | zero[a] | - | - | 1 | SV=1 | NV=0 | D negative | 0 |

FIG. 5B

DIGIT VALIDATION CHECK CONTROL IN INSTRUCTION EXECUTION

BACKGROUND

Binary coded decimal (BCD) is a common encoding of decimal numbers used in various computer systems and across differing formats, such as packed decimal and zoned decimal formats. The number+123 (positive 123), for instance, is represented in packed decimal format as 12 3C in memory, with the space separating values of different bytes. The number 12 3C consumes two bytes of data—four 4-bit fields, in which the three leftmost, i.e. most significant, 4-bit fields hold binary representations of digits 1, 2 and 3, and the least significant 4-bit field holds 'C', the sign code indicating a positive sign. In the zoned decimal format, +123 is represented as F1F2 C3 in three bytes of memory. Each of the three bytes includes (i) a 4-bit field holding the binary representation of a digit and (ii) a 4-bit field holding the zone code for that digit. The first two digits '1' and '2' have the zone code 'F' and the last digit '3' has the sign code 'C', meaning positive.

Performance of convert and move operations, among others, on binary coded decimal numbers when manipulating formats such as zoned decimal and packed decimal are common in programming languages such as COBOL. COBOL and other languages typically have well-defined rules directed to whether and what validation and sign modification should be performed for various cases. Besides changing the number of digits and setting a condition code during these operations, the digits and sign code can also be checked for validity. Using packed decimal numbers as an example, the hardware checks that all digit locations contain a digit in the range 0-9 and that the least significant 4-bit field contains a sign code in the range A through F. If the check fails, a data exception is called. Additionally or alternatively, the sign may be modified as part of these operations.

Performance of operations such as the above has been improved by various instruction set architecture instructions, for instance the known VECTOR PERFORM SIGN OPERATION DECIMAL (VPSOP) instruction of the z/Architecture® hardware architecture offered by International Business Machines Corporation, Armonk, N.Y. (of which z/Architecture is a registered trademark). However, the handling of certain situations in a desired manner remains unaddressed by existing instructions.

For instance, converting relatively large BCD numbers requires several instructions to perform the conversion in parts. It may be desired to preserve the sign of a zero through the multiple conversion steps involved. In this regard, it is well-known that a zero value can have a sign, e.g. positive or negative.

An example conversion of a relatively large (31-digit) BCD number is provided to illustrate. To convert the source 31-digit packed decimal number to a target zoned format, COBOL compilers generate 3 UNPK instructions, for instance: UNPK 1(15,8),400(8,13); UNPK 15(3,8),407(2, 13); UNPK 16(16,8),407(9,13). The last UNPK instruction converts the last 17 digits of the source. Replacing the last UNPK instruction with a vector instruction, for instance as part of an optimization procedure to optimize the compiled COBOL code using newer instructions, uses the VPSOP instruction to truncate the original number to 17 digits and then the VECTOR UNPACK ZONED (VUPKZ) instruction, which is the vector equivalent of the UNPK instruction. If the last 17 digits are all zeros, the result of VPSOP will carry a positive sign no matter the original sign of the source. This leads to an undesired result if the original number is negative.

In another example, the COBOL compiler may use a combination of MVC and OI instructions to force the sign of a BCD number and not check digits thereafter. However, some instructions, e.g. VPSOP, include such checking operations, which could lead to problems. For instance, assume it is desired to move data from a source location (A, containing the number 12 3C) to a target location (B). Example original instructions as input to this sequence are the MVC and OI instructions to move (MVC) data from source A to target B and set the sign code (OI) as 0xF in the target B, i.e.:

MVC B, A [B then contains 12 3C]
    OI B,0xF [B then contains 12 3F; OI is 'or-immediate' which effectively changes the sign to F]

MVC and OI do not perform data or sign validation. In contrast, some instructions, e.g. the VPSOP instruction, used to optimize this COBOL code sequence are configured to validate the decimal digits and throw a data exception if not valid. Using the scenario where the source, A, is A1 3C, it is noted that the 'A' of 'A1' is not a digit in the range 0-9. The MVC+OI sequence in COBOL properly places A1 3F into target B. However, source input A1 3C will cause a data exception under VPSOP execution on the basis that A is not a valid digit in the range 0-9.

It can take significant resources to test and correct the above situations, particularly when there is a large body of code with several instances of an incompatibility such as that described above.

SUMMARY

Shortcomings of the prior art are overcome and additional advantages are provided through the provision of a computer program product for facilitating processing within a computing environment. The computer program product includes a computer readable storage medium readable by a processing circuit and storing instructions for performing a method. The method includes obtaining an instruction to perform one or more operations using at least one input value. The instruction is a single architected instruction, and the instruction includes a no validation indicator for controlling whether digit validation check control is enabled for execution of the instruction. The method also includes executing the instruction. Executing the instruction includes determining, based on the no validation indicator, whether digit validation check control is enabled for execution of the instruction. Executing the instruction also includes performing processing based on the determining. Based on the no validation indicator being set to a defined value, digit validation check control is enabled and the processing includes forcing a digit check error indicator output by the executing to indicate no digit check error with respect to the at least one input value. This has an advantage in that it provides per-instruction control over whether a digit validation check error is indicated by execution of the instruction. Indication of a digit check error can be selectively enabled or disabled on a per-instruction basis, providing the ability to convey no digit check error when a validation check otherwise would, or does, deliver a digit check error on a valid input on the basis that an input digit is not in a range (e.g. 0-9) that is expected. This is advantageous in situations where, for instance, an input digit is not a numerical (0-9) value but is instead a non-numerical encoding in the remaining range of values A through F.

Computer-implemented methods and systems relating to one or more aspects are also described and claimed herein. Further, services relating to one or more aspects are also described and may be claimed herein.

In some embodiments, the executing further includes performing a digit validation check on the at least one input value, the digit validation check to validate whether the at least one input value includes numerical digits in defined positions and to output a result indicating, based on the validation, whether a digit check error exists with respect to the at least one input value.

As one possibility, based on the no validation indicator being set to the defined value, the processing can process the output result of the digit validation check to indicate no digit check error, regardless of whether the output result of the digit validation check indicates that a digit check error exists. Thus, whether a digit check error is output from the overall execution of the instruction can be controlled even when a digit validation performed as part of instruction execution indicates that a digit check error does exist, i.e. even when some digits are indicated as being erroneous by the digit validation check. This has an advantage in that it provides an ability to selectively override the result delivered by the digit validation check when digits do not fall within a range expected by the digit validation check.

As another possibility, based on the no validation indicator being set to the defined value, the processing can further include feeding a selected at least one predefined value, other than the at least one input value, as input into the digit validation check. The at least one predefined input is selected based on the digit validation check being configured for the output result thereof to indicate no digit check error. The digit check error indicator output by the executing can include the output result of the digit validation check indicating no digit check error. This has an advantage in that it provides a way to control whether a digit check error is indicated without altering the output or operation of the validation check performed as part of executing the instruction.

As yet another possibility, based on the no validation indicator being set to the defined value, a digit validation check on the at least one input value to validate whether the at least one input value includes numerical digits in defined positions is bypassed. This has an advantage in that a validation check can be avoided altogether, potentially providing an execution speed increase and resource consumption decrease, lending efficiencies to execution of code.

Additional features and advantages are realized through the techniques described herein. Other embodiments and aspects are described in detail herein and are considered a part of the claimed aspects.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 5A-5E illustrate characteristics of an example instruction configured in accordance with aspects described herein;

DETAILED DESCRIPTION

Figure 1A:
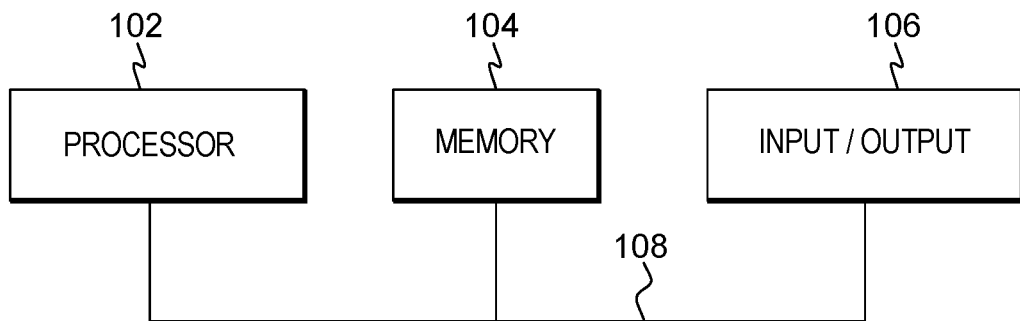
FIG. 1A depicts one example of a computing environment to incorporate and use one or more aspects of the present invention.

In various scenarios, it may be desired to control data validation and/or zero-sign enforcement in the execution of various machine instructions. In the example described above involving the VPSOP instruction to optimize certain compiled COBOL code, a check suppression may be desired in which digit validation checking on input data is suppressed.

Aspects described herein provide such data validation and zero-sign control. Flexibility is thereby provided in terms of whether and when to perform these activities as part of instruction execution, thereby reducing complexity in the resulting code. Further, by controlling whether these activities are performed, performance is improved.

In accordance with aspects described herein, a capability is provided to facilitate processing within a computing environment. In one example, the capability includes providing, on a per-instruction basis, zero-sign control, e.g. negative zero control, as part of operation of an instruction that produces a signed zero value. The operation includes, for instance, a computational operation (e.g., arithmetic—decimal, binary coded decimal, floating point), a convert operation (e.g., binary to decimal, decimal to binary, etc.) and/or a move operation (e.g., move decimal value from one location (e.g., register) to another location), as examples. Control over the sign of the result, in particular whether a negative zero result can be an output of the instruction execution, enables efficient operation and enables obtaining a desired result in all scenarios, thereby avoiding having to perform error or other checking, and thus improving overall performance.

In specific examples, modifier bit(s) in the instruction code are provided to enable or disable negative zero control, e.g. control whether the sign on a zero result is preserved or inverted, and more particularly whether to force that a zero-magnitude result be output as a positive zero regardless of how it is initially signed. The modifier bit(s) may be a "negative zero control indicator" as used herein. In some examples, the negative zero control indicator is incorporated into new architected instructions. In other examples, the negative zero control indicator is incorporated into an existing architected instruction, for instance as an enhancement to the known VPSOP instruction. In the particular example of the VPSOP instruction, the negative zero control indicator may be particularly utilized for the Maintain and Complement modes/variants of the VPSOP instruction, as described herein. Maintain and Complement are two of several (e.g. four) modes/variants of the current VPSOP instruction. The modes are related to sign operations as dictated by the Sign Code of that instruction.

In accordance with other aspects described herein, a capability is provided to facilitate processing within a computing environment, including providing, on a per-instruction basis, digit validation check control. In particular examples, modifier bit(s) in the instruction code are provided to control digit check error indications. These modifier bit(s) may be termed herein a "no validation indicator". In some examples, the no validation indicator is incorporated into new architected instructions. In other examples, the no validation indicator is incorporated into an existing architected instruction, for instance as an enhancement to the known VPSOP instruction.

Thus, the negative zero control indicator and/or no validation indicator can be incorporated into new instructions or incorporated as modification(s) to existing instructions, such as an existing VPSOP instruction. For existing instructions, bit(s) in the instruction text that are either unused or able to be repurposed could instead be used as the negative zero control indicator and/or no validation indicator to provide functionality described herein.

Aspects can remove the performance degradation otherwise experienced in the COBOL cases described above. For instance, without the improvements described herein, some existing instruction(s), such as the MVC and OI combinations, would not be enhanced, and would therefore be carried unoptimized into the otherwise optimized code even though surrounding COBOL operations could be converted to more efficient instructions. In addition, lack of optimization of one portion of the original COBOL code could also render it difficult or impossible to optimize other parts of the original COBOL code if tightly tied to the portion that cannot be optimized.

As one example, the instruction is part of an instruction set architecture (ISA). For instance, it is a single architected hardware machine instruction at the hardware/software interface. The instruction may be one of a number of instructions that perform computational operations, convert operations, move operations, sign operations, and/or other operations. The instruction is used in many types of processing including, but not limited to, computer processing, security processing, emulation, code optimization, and performing computations for various technologies, as examples.

In accordance with an aspect, the digit validation check control and/or negative zero control may be enabled and disabled on a per-instruction basis. For instance, the negative zero control indicator and no validation indicator are included in an instruction (or otherwise associated with the instruction), and, when set in the instruction, temporarily enable the negative zero control and the digit validation check control, respectively.

One embodiment of a computing environment to incorporate and use one or more aspects of the present invention is described with reference to FIG. 1A. A computing environment 100 includes a processor 102 (e.g., a central processing unit), a memory 104 (e.g., main memory; a.k.a., system memory, main storage, central storage, storage), and one or more input/output (I/O) devices and/or interfaces 106 coupled to one another via, for example, one or more buses 108 and/or other connections.

In one example, processor 102 is based on the z/Architecture hardware architecture offered by International Business Machines Corporation, Armonk, N.Y., and is part of a server, such as an IBM Z° server, which is also offered by International Business Machines Corporation and implements the z/Architecture hardware architecture. One embodiment of the z/Architecture hardware architecture is described in a publication entitled, "z/Architecture Principles of Operation," IBM Publication No. SA22-7832-11, $12^{th}$ edition, September 2017, which is hereby incorporated herein by reference in its entirety. The z/Architecture hardware architecture, however, is only one example architecture; other architectures and/or other types of computing environments may include and/or use one or more aspects of the present invention. In one example, the processor executes an operating system, such as the z/OS® operating system, also offered by International Business Machines Corporation.

Figure 1B:
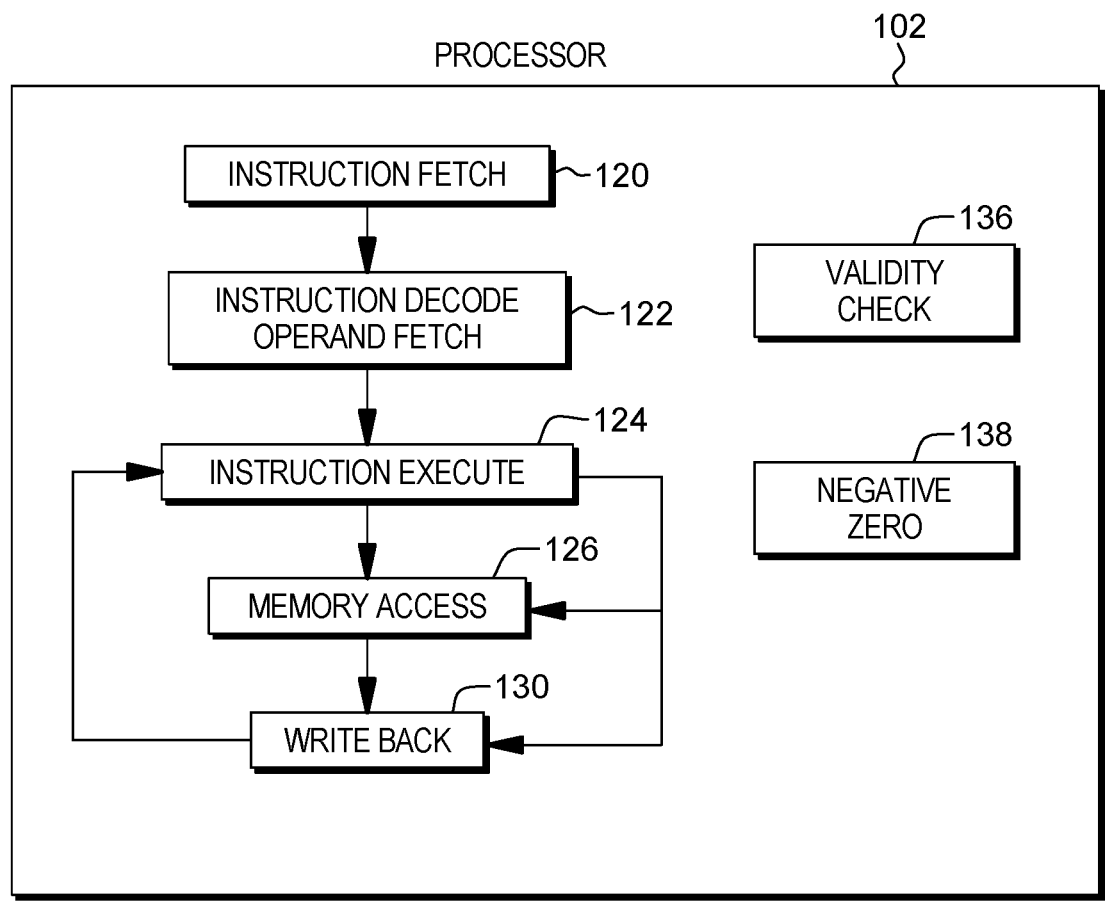
FIG. 1B depicts further details of a processor of FIG. 1A, in accordance with one or more aspects of the present invention.

Processor 102 can include a plurality of functional components used to execute instructions. As depicted in FIG. 1B, these functional components include, for instance, an instruction fetch component 120 to fetch instructions to be executed, an instruction decode unit 122 to decode the fetched instructions and to obtain operands of the decoded instructions, an instruction execute component 124 to execute the decoded instructions, a memory access component 126 to access memory for instruction execution, if necessary, and a write back component 130 to provide the results of the executed instructions. One or more of these components may, in accordance with one or more aspects of the present invention, include at least a portion of or have access to one or more other components used in validity check and/or negative zero processing, including digit validation check control processing and/or negative zero control processing, as described herein. The one or more other components include, for instance, a validity check component 136 and a negative zero component 138.

Another example of a computing environment to incorporate and use one or more aspects of the present invention is described with reference to FIG. 2. In one example, the computing environment is based on the z/Architecture hardware architecture, though the computing environment may be based on other architectures offered by International Business Machines Corporation or others.

Figure 2:
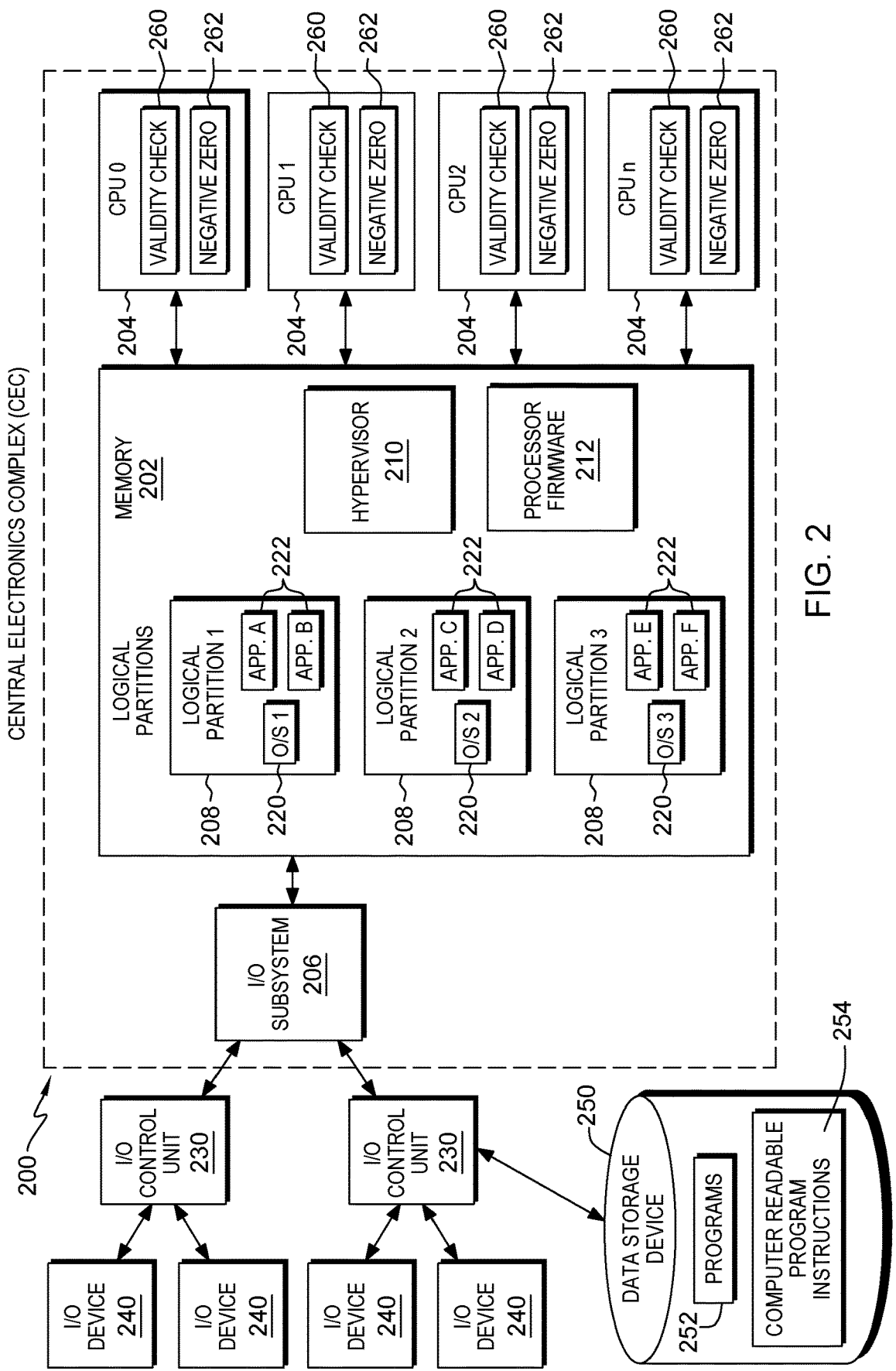
FIG. 2 depicts another example of a computing environment to incorporate and use one or more aspects of the present invention.

Referring to FIG. 2, in one example, the computing environment includes a central electronics complex (CEC) 200. CEC 200 includes a plurality of components, such as, for instance, a memory 202 (a.k.a., system memory, main memory, main storage, central storage, storage) coupled to one or more processors (a.k.a., central processing units (CPUs)) 204, and to an input/output subsystem 206.

Memory 202 includes one or more logical partitions 208, a hypervisor 210 that manages the logical partitions, and processor firmware 212. One example of hypervisor 210 is the Processor Resource/System Manager (PR/SM™) hypervisor, offered by International Business Machines Corporation, Armonk, N.Y. As used herein, firmware includes, e.g., the microcode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Each logical partition 208 is capable of functioning as a separate system. That is, each logical partition can be independently reset, run a guest operating system 220 such as the z/OS operating system, or another operating system, and operate with different programs 222. An operating system or application program running in a logical partition appears to have access to a full and complete system, but in reality, only a portion of it is available.

Memory 202 is coupled to processors (e.g., CPUs) 204, which are physical processor resources that may be allocated to the logical partitions. For instance, a logical partition 208 includes one or more logical processors, each of which represents all or a share of a physical processor resource 204 that may be dynamically allocated to the logical partition. In one example, processor 204 includes a validity check component 260 to perform digit validation check control and negative zero control component 262 to perform zero-sign control, also referred to as negative zero control, as described herein.

Further, memory 202 is coupled to I/O subsystem 206. I/O subsystem 206 may be a part of the central electronics complex or separate therefrom. It directs the flow of information between main storage 202 and input/output control units 230 and input/output (I/O) devices 240 coupled to the central electronics complex.

Many types of I/O devices may be used. One particular type is a data storage device 250. Data storage device 250 may store one or more programs 252, one or more computer readable program instructions 254, and/or data, etc. The computer readable program instructions may be configured to carry out functions of embodiments of aspects described herein.

Computer readable program instructions configured to carry out functions of embodiments of aspects described herein may also or alternatively be included in memory 202. Many variations are possible.

Central electronics complex 200 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central electronics complex 200. Examples include, but are not limited to: microcode, device drivers, redundant processing units, external disk drive arrays, RAID systems, tape drives, and data archival storage systems, etc.

Further, central electronics complex 200 may be operational with numerous other general purpose or special purpose computing system environments or configurations. Examples of well-known computing systems, environments, and/or configurations that may be suitable for use with central electronics complex 200 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Although various examples of computing environments are described herein, one or more aspects described herein may be used with many types of environments. The computing environments provided herein are only examples.

In accordance with an aspect described herein, an instruction executing on a processor, such as processor 102 or 204, includes or has access to a per-instruction negative zero control indicator that indicates whether negative zero control as described herein is enabled for execution of the instruction. By enabling negative zero control, a sign of a zero result output from executing the instruction may be negative. In the same situation but where negative zero control is not enabled, as indicated by the negative zero control indicator, then a negative-signed zero-magnitude result will be forced to a positive-signed zero-magnitude result. In some examples, execution of the instruction performs operations that set the sign of a zero-magnitude result to be negative. Further processing of the instruction in accordance with aspects described herein, and depending on the negative zero control indicator, forces a positive sign on that zero value, or allows the zero result to be output with the negative sign. The negative zero control indicator can therefore control whether a negative zero is an acceptable output data result.

In accordance with another aspect described herein, an instruction executing on a processor, such as processor 102 or 204, includes or has access to a per-instruction no validation indicator that controls whether digit validation check control is enabled for execution of the instruction. By controlling whether digit validation check control is enabled, such digit validation checking can be disabled or enabled as desired. Digit validation check control being enabled refers to forced indication of no digit check error from execution of the instruction, despite whether a digit validation performed as part of instruction execution indicates a digit check error.

Further details regarding the negative zero control indicator, no validation indicator, and processing associated therewith are described with reference to FIGS. 3 and 4A-4B.

Figure 3:
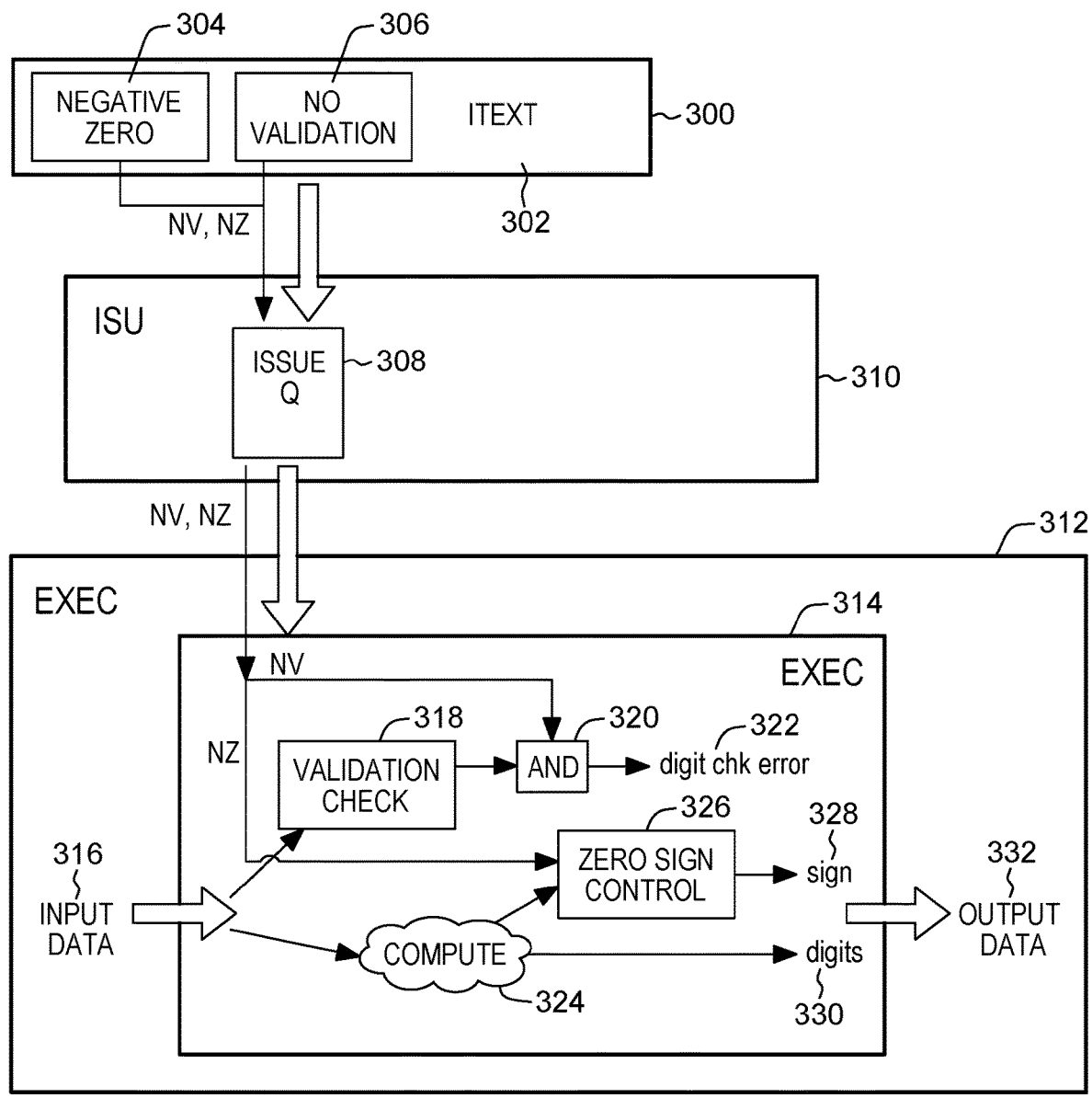
FIG. 3 depicts one example showing instruction execution based on a negative zero control indicator and on a no validation indicator of the instruction, in accordance with aspects described herein.

FIG. 3 depicts one example showing instruction execution based on a negative zero control indicator and on a no validation indicator of the instruction, in accordance with aspects described herein.

Referring initially to FIG. 3, in one embodiment, an instruction 300 includes a plurality of fields, including a field 304 having a negative zero control indicator (NZ), a field 306 having a no validation indicator (NV), and one or more other fields included as part of instruction text (Itext) 302. The instruction text includes, for instance, operands used to perform an operation specified by the instruction text. The instruction can perform many types of operations on input data 316 including, but not limited to, computations, such as arithmetic operations, e.g., decimal operations, binary coded decimal operations, floating point operations, etc.; conversion operations, such as binary to decimal, decimal to binary, etc.; and/or move operations (e.g., move decimal), as examples. Input data 316 can therefore be or include one or more operands from a register file, cache, or the memory hierarchy, as examples. The one or more operands is/are or include binary coded decimal data, for instance.

In another embodiment, the NZ and NV indicators are not in an explicit field of the instruction, but instead are included in implied field(s) or register(s) of the instruction. Further, in another embodiment, the NZ and NV indicators are not part of the instruction itself, but in location(s) (e.g., register(s) or memory location(s)) accessible to the instruction, or part of another instruction (e.g., a prefix instruction) used to modify the instruction to be executed. Regardless of the embodiment, the NZ and NV indicators are per-instruction indicators provided specifically for the instruction that is to perform one or more operations.

It is also noted that the instruction in the example of FIG. 3 includes both the NZ and NV indicators for negative zero control and no validation control. In other embodiments, the instruction includes just one of the indicators to provide just negative zero control or just no validation control, as the case may be.

Continuing with FIG. 3, the instruction is dispatched to an issue queue 308 of an instruction sequencing unit 310 of the processor where it waits until, for instance, its operands are available. When ready, the instruction is issued to appropriate functional execution unit 314 of an execution unit 312 of the processor. As examples, if the instruction is a decimal instruction, it is issued to a functional unit that performs decimal computations, and if it is a floating point instruction, it is issued to a floating point functional unit. Other examples are possible.

Execution unit 314 receives the instruction to execute as well as the NZ control indicator 304 and the NV indicator 306. The instruction is executed, in which one or more operations are performed. A digit check error 322 is indicated and output data 332 is produced as a result of executing the instruction.

In accordance with aspects described herein, the NZ control indicator is input into zero sign control component 326 and the NV indicator is input into a logical operator, i.e. AND gate 320, used to indicate whether a digit check error is to be reported on 322. With respect to the NV indicator, if digit validation check control is enabled, e.g. NV=1, to thereby control the digit validation check and force no digit check error to be reported on 322, then the digit check error 322 is to indicate no digit check error regardless of whether digit validation check 318 indicates that there is a digit validation error. If negative zero control is enabled, e.g. NZ=1, to thereby indicate that negative zero is an acceptable output data result, then a zero result signed either as positive or negative may be an output of the instruction's execution. If negative zero control is disabled, e.g. NZ=0, then the sign 328 of a zero result of computation(s) 324 is subjected to potential inversion, e.g. from negative to positive, in accordance with aspects described herein, such that the digits 330 of output data 332 have a sign 328 of, e.g., positive even though the result of the computations 324 was a negative zero.

The negative zero control (NZ) indicator has an effect of enabling or disabling negative zero control, resulting in control over the sign of an output zero value of the computations 324. Negative zero control being enabled refers to control over execution of the instruction to enable negative zero results to be an output of the execution. When negative zero control is disabled by way of the NZ indicator, this may force a particular, e.g. positive, sign to zero-magnitude results. It is noted that this forcing does not mean that a manipulation to the sign of the result output from the computations 324 necessarily occurs; if the result is already signed as positive, the sign is not changed even though it is being subjected to a forced positive output. Whether a sign of a result of computation(s) 324 is changed may depend on, for instance, the particular sign operations for a given instruction. For instance, certain instructions may be executed in different modes corresponding to particular sign operations. One such sign operation may indicate that any result of processing is to have a positive sign. If this is the case, an inversion of the sign of a zero-magnitude value can result regardless of whether NZ is enabled.

Thus, whether a sign change to a result computed by computation(s) 324 is or is not made can be a function of the input data, the computations themselves, the NZ control indicator, and a sign operation of the instruction. In some examples, a lookup table such as depicted in FIG. 5B is used to indicate whether the zero sign control 326 is to invert or retain the sign provided to it from the computation(s) 324. The zero sign control 326 controls whether to maintain the sign of the zero result output from computation(s) 324 or instead negate the sign.

To illustrate, take an example VPSOP instruction which has sign operations corresponding to four modes—Maintain, Complement, Force Positive, and Force Negative. In the force-positive case, the output is to always be signed positive. Output zero-magnitude results are to be positively signed (e.g. 00 0C or 00 0F as examples) regardless of whether NZ=0 or NZ=1. Thus, any zero-magnitude result signed negative (e.g. 00 0D) will be forced to positive (e.g. 00 0C or 00 0F) regardless of the NZ indicator's value.

The maintain case maintains the sign of the value. Conventional VPSOP processing on a negative zero, for instance 00 0D, would produce a positive zero, despite the sign operation indicating to maintain a result's sign, because conventional VPSOP would not output a zero signed as negative. However, with the negative zero facility described herein, the result is different if negative zero control is enabled. For instance, if negative zero control is not enabled (NZ=0) the execution would force a positive sign to the negative zero result. The instruction would output a positive zero in the maintain case. If instead NZ=1 to enable negative zero control, then in accordance with aspects described herein negative zero input is maintained and is output as negative zero. That is, the negative zero result would not be subjected to the forced-positive practice of conventional VPSOP or processing described herein when NZ=0.

In the forced negative case, since conventional VPSOP processing would not permit a zero output to have a negative sign, the output of a zero-magnitude value would be positive zero. Thus, example conventional VPSOP processing would output a positive zero on input 00 0x (where x is any input sign). If NZ=0, then negative zero control is not enabled and the output would be the same as conventional functioning, i.e. positive zero. However, if instead NZ=1, then in accordance with aspects described herein the output of a negative zero is allowed. The zero sign control 326 receiving a zero value result signed as negative would output the negative zero. Input 00 0x (where x is any input sign) would therefore result in an output of negative zero.

In the complement case, conventional VPSOP processing would not complement a positive zero to an output negative zero. However, with negative zero control being enabled (e.g. NZ=1), the generation and output of a negative zero is allowed; the zero sign control 326 passes zero magnitude results of either sign as output of the instruction, thereby enabling a complement of a positive zero input. Thus, the input positive zero is changed to negative zero and is output as such.

Further details regarding processing associated with the negative zero control indicator are described with reference to FIG. 4A. In one example, this processing is performed by a processor, such as processor 102 or processor 204.

Figure 4A:
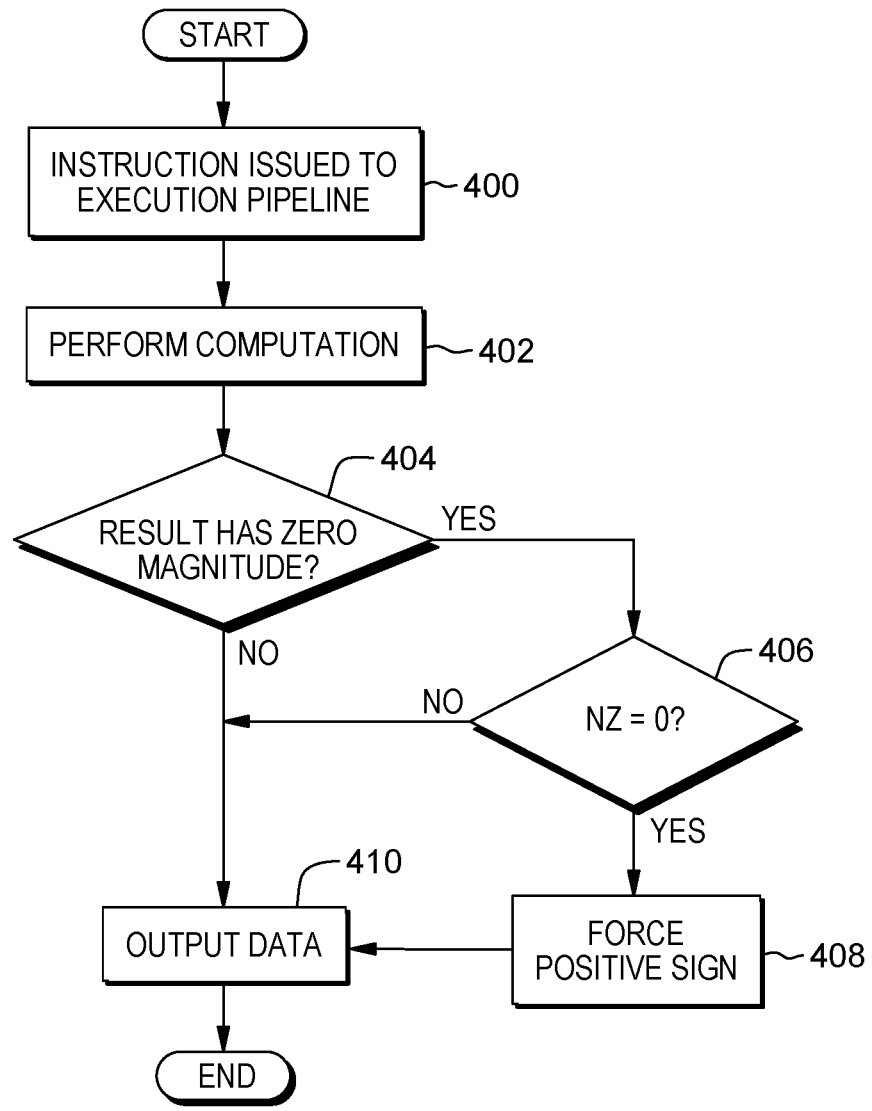
FIG. 4A depicts one example of processing associated with using the negative zero control indicator of the instruction of FIG. 3, in accordance with aspects described herein.

Referring to FIG. 4A, initially, an instruction is issued to an execution unit of the processor (e.g., execution unit 312), STEP 400. The instruction is executed by the execution unit of the processor to perform computation(s), STEP 402. A determination is made as to whether a result has a zero magnitude (i.e. is a numerical zero), INQUIRY 404. If not (404, N), then the process outputs data, STEP 410, including, for instance the result as it is signed. If instead at 404 the result has a zero magnitude (404, Y), then the process determines whether NZ is equal to 0, INQUIRY 406. If NZ is not equal to zero (406, N), for instance NZ=1, then negative zero control is enabled, and therefore negative zero-magnitude results, along with positive zero results, are enabled to be output. The process proceeds to STEP 410 to output data including the result as it is signed, be it positive or negative. Otherwise, if NZ is equal to 0 (406, Y), negative zero control is disabled and the process proceeds by forcing a positive sign to the result, STEP 408, and outputting data, STEP 410, which includes the result with the forced positive sign. It is noted that the forcing the positive sign is not to imply that a change was per se made to the sign of the result; if the result was signed positive, then no change is necessary. Even in this scenario, though, the positive zero result may be subjected to the forced positive sign aspect (STEP 408) of the process as depicted, and is output therefrom as part of the output data (STEP 410).

In some examples, the negative zero control is said to be enabled when the negative zero indicator is set. The negative zero control indicator is said to be set when, for instance as in FIG. 4A, it is set to a defined value, for instance one ('1'). If the negative zero control indicator is set to another defined value, e.g. to zero ('0'), then negative zero control is not enabled. The specific defined values for enabling and disabling the negative zero control could vary, for instance '0' could enable negative zero control while '1' disables negative zero control.

Referring back to FIG. 3, validation check 318 includes a digit validation check against input data 316, for instance input operand(s) of the instruction. The digit validation check is to check that the input operands contain valid digits, e.g. in the range 0-9. However, this can be problematic in cases where valid numbers are formed with a combination of letters and numbers as digits, for instance the case where A expresses a non-numerical encoding in the remaining range (A through F) of values.

In accordance with aspects of FIG. 3, the validation check 318 is performed and the output is fed into an AND gate 320 to be AND-ed with another input, in this case the NV indicator (or modified variant, for instance the inversion, thereof). The output of the AND gate is the digit check error indicator 322. The AND gate controls whether to use the result of the validation check 318, which is fed into the AND gate, as the digit check error 322. AND-ing that result with a false value, e.g. '0', will always produce a false (e.g. '0') result for the digit check error 322, which is taken to mean that no digit check error is present. AND-ing with the value '1' or another true value will effectively result in a true or false digit check error dependent on the output of 318, i.e. whether a digit check error was indicated by 318. In this manner, the result of the validation check 318 can be selectively used or not used as the digit check error 322, and this selective control is referred to herein as "validation check control". If enabled, the control is exerted to control the digit check error indication 322. If disabled, then no such control is exerted and the digit check error indication 322 is, for instance what was indicated by the validation check 318.

In some examples, the digit validation check control is said to be enabled when the no validation control indicator is set. The no validation control indicator is said to be set when, for instance, it is set to a defined value, for instance one ('1'). If the no validation control indicator is set to another defined value (e.g., to zero), then no validation control is not enabled. The specific defined values for enabling and disabling the no validation control could vary, for instance '0' could enable no validation control while '1' could disable no validation control.

In some examples, the NV indicator is used in setting the digit check error indicator 322. In one particular example, NV is a single bit which, when set to 1, indicates that the result of the validation check 318 is to be suppressed, i.e. the no validation control is enabled. In cases such as FIG. 3 where the AND gate is used, the NV bit may be inverted before being input to AND gate 320. By inverting the 1 to a 0, which a value of 'false', the AND gate 320 receives at least one false value, causing the AND gate to output 'false' as the digit check error 322, which indicates no digit check error. This is regardless of whether a digit check error was indicated by the validation check 318.

The use of the AND gate in FIG. 3 is just one example of controlling whether a digit check error is indicated by 322. As another example, an AND gate or other hardware circuitry is positioned before the validation check 318 and takes as input at least the value of the NV indicator. This circuitry sitting before the validation check can be configured to output to the validation check 318 some valid input that will cause the validation check to indicate no digit check error. For instance, an input of a zero value to the validation check could result in no digit check error being indicated. In a particular example where NV=1 to enable no validation control, the NV indicator is inverted to zero and input to an AND gate, where the output of the AND gate is fed as input to the validation check 318. That zeros-out the input to validation check 318 and results in a 0 output from the validation check to indicate no digit check error 322.

Processing associated with using the no validation control is described with reference to FIG. 4B. In one example, this processing is performed by a processor, such as processor 102 or processor 204.

Figure 4B:
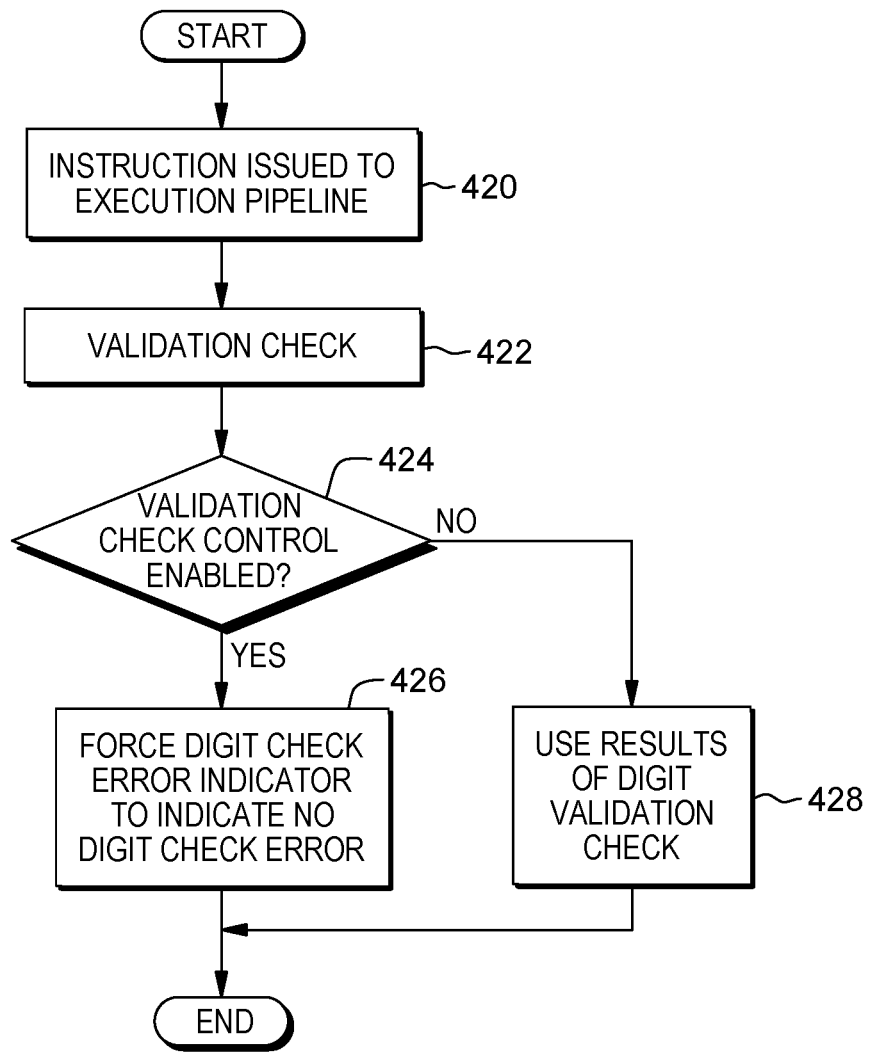
FIG. 4B depicts one example of processing associated with using the no validation indicator of the instruction of FIG. 3, in accordance with aspects described herein.

Referring to FIG. 4B, initially, an instruction is issued to an execution unit of the processor (e.g., execution unit 312), STEP 420. The instruction is executed by the execution unit of the processor to perform a validation check, STEP 422, for instance a digit validation check. A determination is made as to whether digit validation check control is enabled, INQUIRY 424. Digit validation check control refers to whether or not control is to be exerted over the digit check error indication (322) to be output. The validation check control being enabled is to mean that control is to be exerted over the digit check error indication (e.g. to indicate no digit check error). The control being disabled is to mean that no such control is exerted over the digit check error indicator and the digit check error indication is, for instance, what was indicated by the validation check 422. In one example, this determination is made by checking the no validation (NV) indicator. If the digit validation check control is enabled, (424, Y), then a digit check error indicator is forced to indicate no digit check error, STEP 426. In a particular example, this is accomplished by feeding the output of the digit validation check into circuitry, such as an AND gate, such that the output of the circuitry is digit check error indicator 322 that indicates no digit check error.

If instead it is determined that validation check control is not enabled (424, N), then the process uses the result of the digit validation check as output the digit check error indicator, STEP 428.

Accordingly, aspects described herein provide for encoding in an instruction word the suppression of the BCD digit checking and preservation or inversion of a BCD sign of a zero magnitude result.

In the example of FIGS. 3 and 4B, the digit validation check is performed unconditionally and the output thereof is (i) selectively manipulated to indicate no error or is (ii) allowed to pass through as the output digit check error indicator. The result is the suppression of a check error if no validation control is enabled. However, in some embodiments, the validation check is bypassed altogether if digit validation check control is enabled. In other words, the validation check 318 itself could be prevented from occurring or bypassed altogether in some scenarios, for instance if the subject instruction is being emulated on an architecture by way of selected software code. In that case, the NV indicator could be checked and the digit check processing in software could be skipped if NV is set to the defined value indicating digit check validation control is enabled.

As noted, the negative zero control indicator and/or no validation indicator can be incorporated into new instructions or as modification(s) or enhancement(s) to existing instructions. One example instruction is a variant of a known VPSOP instruction. FIGS. 5A-5E illustrate characteristics of an example instruction configured in accordance with aspects described herein.

FIG. 5A depicts an example instruction format. The instruction includes operation code field 502a and 502b, a first operand field 504 for a first operand, a second operand field 506 for a second operand, immediate data fields 508 and 510, mask field 512, and extension field 514.

In this instruction, a modified sign and specified number of rightmost digits of the second operand are placed in the first operand location with other digits set to zero. The operand and result are in the signed-packed-decimal format.

All digit codes of the second operand are checked for validity, unless the operand 2 no validation (NV) control is one. The sign code of the second operand is checked for validity based on the Sign operation (SO) control, the operand 2 sign validation (SV) control and the operand 2 no validation (NV) control, as specified in FIG. 5B which is a table showing operation of the example instruction. The table includes the following columns: Sign Operation (SO) 520, Result Magnitude (after RDC applied) 522, V2 sign 524, Positive Sign Code (PC) 526, Negative Zero (NZ) 528, V2 Sign Code Validity Check 530, V2 Digit Code Validity Check perform if . . . 532, result Sign Code (hex) 534 and Condition Code 536.

The result sign code is a function of the SO control, the second operand sign, the second operand digits, the result digits count (RDC) control, the positive sign code (PC) control, and the negative zero (NZ) control, as specified in FIG. 5B.

In FIG. 5B, '—' indicates that the results do not depend on this value; 'a' indicates that a result magnitude is considered nonzero if any bits of the result is non zero; 'b' indicates a sign code between 0-9 is considered invalid; 'c' indicates that this produces a suppressing data exception; and 'd' indicates that the table is showing the condition code for the non-overflow case—the overflow case will deliver a condition code 3 (CC3).

If the RDC control does not specify enough digits to contain all leftmost nonzero digits of the second operand, decimal overflow occurs. The operation is completed. The result is obtained by ignoring the overflow digits, and if the condition code set (CS) flag is one, condition code 3 is set. If the decimal-overflow mask in the PSW is one and the instruction overflow mask (IOM) is zero, a program interruption for decimal overflow occurs.

If the RDC control specifies less than thirty-one digits, zeros are placed in the remaining leftmost digits of the first operand.

Figure 5C:
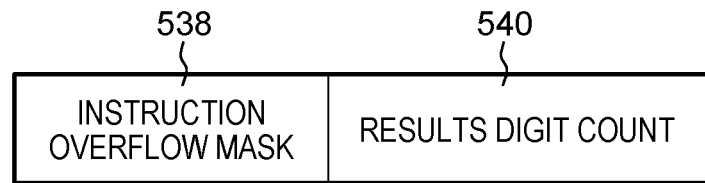

The I3 field 510 of FIG. 5A has an example format shown in FIG. 5C, including an instruction overflow mask (IOM) 538 and a results digit count (RDC) 540. In particular examples, the I3 field is 8 bits long, the IOM is the first bit, bit 0, and the RDC is the last 5 bits (i.e. bits 3-7).

Regarding the IOM 538, if a Vector-Packed-Decimal-Enhancement Facility is not installed or bit 0 is zero, a program interruption for decimal overflow is presented depending on the decimal-overflow mask in the PSW. If the Vector-Packed-Decimal-Enhancement Facility is installed and bit 0 is one, a program interruption for decimal overflow is not recognized regardless of the value of the decimal-overflow mask in the PSW.

Regarding the RDC 540, i.e. bits 3-7, these contain an unsigned binary number specifying the number of rightmost digits of the second operand to be placed in the first operand. If the magnitude of the second operand is larger than the largest decimal number that can be represented with the specified number of digits, decimal overflow occurs, and if the decimal-overflow mask is one, a program interruption for decimal overflow occurs. If the RDC field is zero, a specification exception is recognized.

In this example bits 1-2 of I3 are reserved and optional. In some examples, they are to contain zeros. If the Vector-Packed-Decimal-Enhancement Facility is not installed, then bit 0 of I3 may also be reserved and is to contain zero. Otherwise, a specification exception is recognized.

Figure 5D:
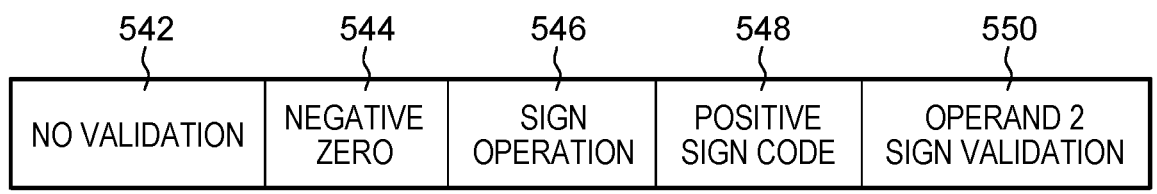

The I4 field 508 of FIG. 5A has an example format shown in FIG. 5D.

No Validation (NV) 542 is a one-bit field in bit 0 of the I4 field. If bit 0 is zero or the Vector-Packed-Decimal-Enhancement Facility is not installed, then the second operand digits are checked for validity; if the SO control specifies maintain sign, then the second operand sign code is also checked for validity. Sign code validity is always checked for if the SO control specifies complement sign and dependent on SV control if the SO control specifies force positive or force negative. If the validity check fails, a data exception is recognized. If instead bit 0 is set to '1' to indicate digit validation check control is enabled, then the second operand digits are not checked for validity or any result of such checking is suppressed as described herein, and if the SO control specifies maintain sign, then the second operand sign code is also not checked.

Negative Zero (NZ) 544 is a one-bit field in bit 1 of the I4 field. If bit 1 is zero or the Vector-Packed-Decimal-Enhancement Facility is not installed, a zero result after applying the RDC will result in a positive sign. If instead bit 1 is one to indicate that negative zero control is enabled, e.g. NZ=1, then the sign of a zero result after applying the RDC will be dependent of the second operand sign if the SO control does not specify force positive or force negative.

Sign Operation (SO) 546 is a two-bit field in bits 4-5 of the I4 field. The SO bits specify the sign operation used in determining the result sign code. The result sign code is a function of the SO control, the second operand sign, the second operand digits, the RDC control, and the PC bit, as specified in the table of FIG. 5B.

Positive Sign Code (PC) 548 is a one-bit field in bit 6 of the I4 field. If bit 6 is one, sign code 1111 is used when the result is positive. When bit 6 is zero, sign code 1100 is used when the result is positive.

Operand 2 Sign Validation (SV) 550 is a one-bit field in bit 7 of the I4 field. If bit 7 is one and the SO control specifies force positive or force negative, then the second operand sign code is checked for validity. If bit 7 is zero and the SO control specifies force positive or force negative, then the second operand sign code is not checked for validity. When the SO control specifies maintain or complement sign, the second operand sign code is checked for validity, based on the NV bit value. If the validity check fails, a data exception is recognized.

In some examples, bits 2-3 of the I4 field are ignored but are to contain zeros, otherwise the program may not operate compatibly in the future.

Figure 5E:
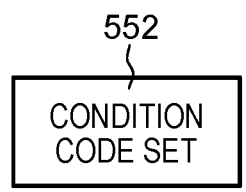

The M5 field 512 of FIG. 5A has an example format shown in FIG. 5E, having a condition code set (CS) field 552. In some examples M5 is 4 bits long and CS 552 is a one-bit field in the last bit, bit 3, of the M5 field. When bit 3 is zero, the condition code is not set and remains unchanged. When bit 3 is one, the condition code is set as specified in the resulting condition code section below. Bits 0-2 of the M5 field may be ignored but are to contain zeros, otherwise the program may not operate compatibly in the future.

When the CS bit is one, the condition code is set as follows: 0—Result zero, no overflow; 1—Result less than zero, no overflow; 2—Result greater than zero, or nonzero result and invalid sign code, no overflow; 3—Overflow.

When the CS bit is zero, the condition code remains unchanged.

Example Program Exceptions include Data with DXC FE, vector instruction; Data with DXC 00, general operand; Decimal overflow; Operation (if the Vector-Packed-Decimal Facility for z/Architecture is not installed; Specification; and Transaction constraint.

As a programming note, a zero result after applying the RDC can always result in a CC0 if the CS bit is one, independent of the positive or negative sign of the zero.

As described herein, in accordance with an aspect, a per-instruction negative zero control indicator is used to determine whether or not negative zero control is enabled. By using this indicator, negative zero output can be selectively enabled for an instruction that is otherwise configured such that any output zero value is forced-signed as positive. This can avoid performance of a fixup by way of subsequent processing in cases where the output positive zero is properly to be signed as a negative, thus saving additional processing cycles, reduces the code length and reduces complexity.

In accordance with another aspect, a no validation indicator is used to determine whether or not digit validation check control is enabled. By using this indicator, digit check suppression can be selectively enabled for an instruction that might otherwise indicate a digit check error. This can avoid situations in which a digit check would otherwise indicate a digit check error, which can cause unnecessary data exceptions. Avoidance of such situations saves additional processing cycles, reduces the code length, and reduces complexity.

Additionally, by providing a per-instruction indicator, user code can specify for different parts of the code whether negative zero control and/or digit validation checking control is to be performed.

One or more aspects of the present invention are inextricably tied to computer technology and facilitate processing within a computer, improving performance thereof. By providing per-instruction negative zero control, performance is enhanced by, for instance, enabling updated instructions to produce desired negative zero outputs and thereby enable their use in optimization of code to saving additional processing cycles, reducing the code length and reducing complexity. By providing per-instruction digit validation check control, performance is enhanced by, for instance, reducing the number of data exceptions taken and by providing flexibility in the user code.

An instruction using a per-instruction negative zero control and/or no validation indicator(s) may be included in many types of processing performing different types of tasks. For instance, it may be included in internal computer processing where computations, conversions and/or moves are performed; in security processing that verifies credentials; in code emulation; in code optimization; and in any processing that arithmetic operations are used in performing a task. Many possibilities exist.

Figure 6A:
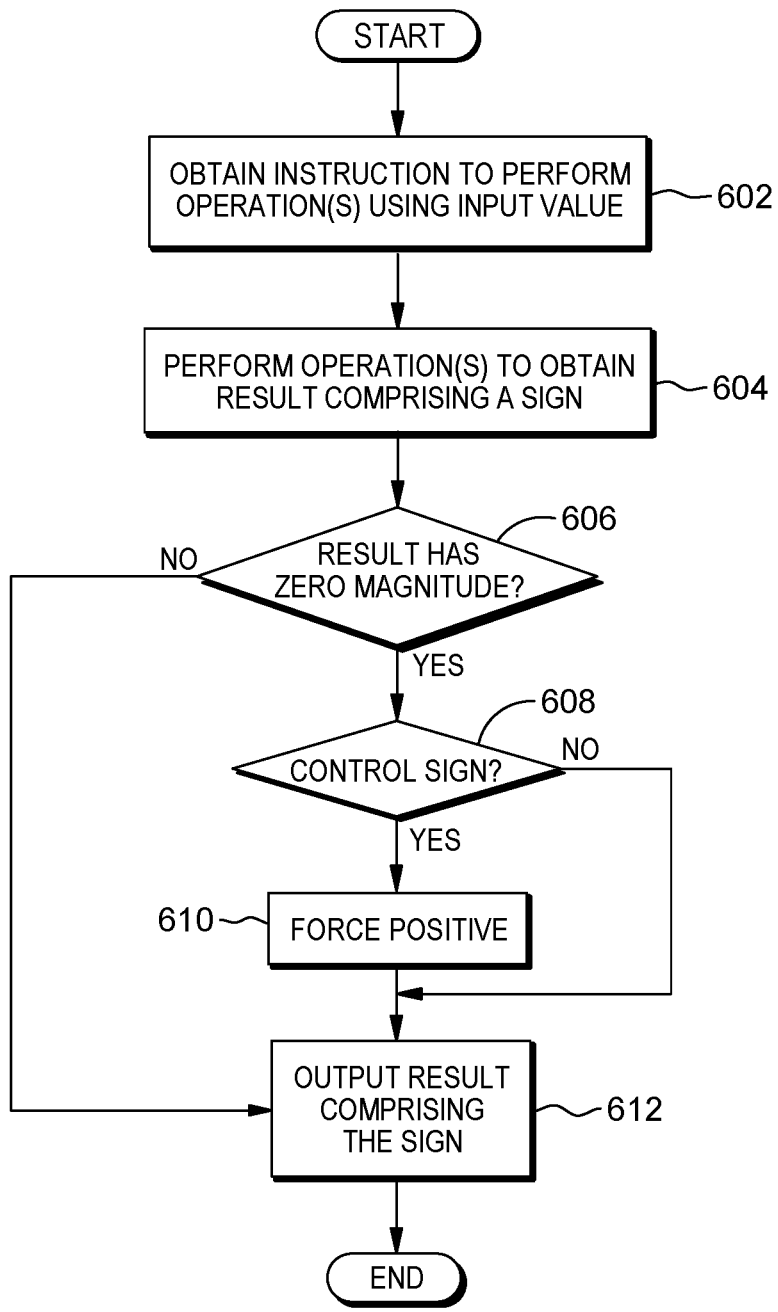
FIGS. 6A-6B depict examples of facilitating processing within a computing environment, in accordance with aspects described herein.
Figure 6B:
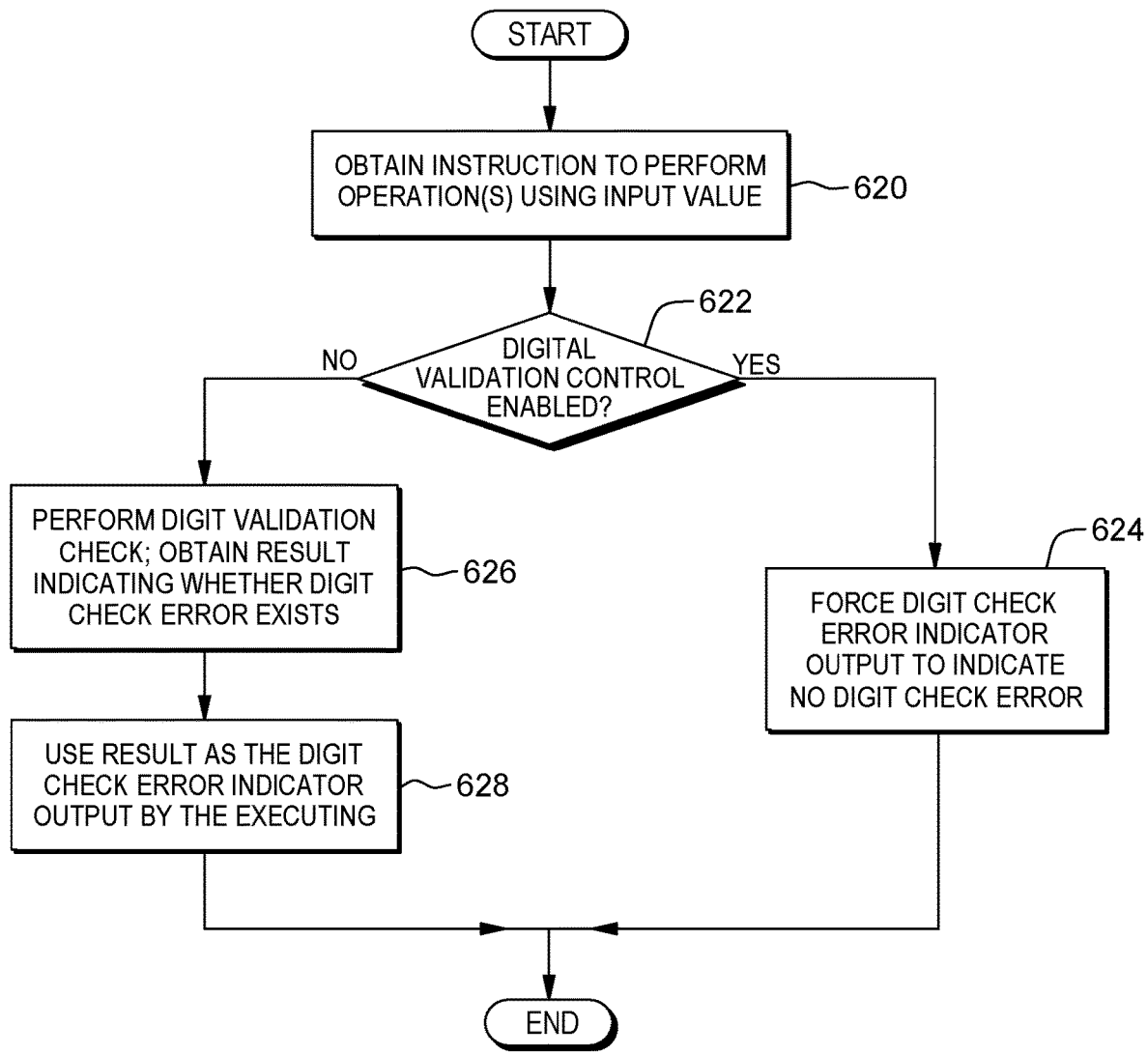

FIGS. 6A-6B depict example processes of facilitating processing within a computing environment, in accordance with aspect described herein. In some examples, the processes are performed by one or more computer systems, such as those described herein.

Referring to FIG. 6A, depicting an example process associated with the negative zero control indicator, the process obtains an instruction to perform one or more operations using an input value (602). The one or more operations can include specific computation(s) to be performed by the instruction, for instance data conversion, data movement, or a sign operation against an input value, as examples. The instruction is a single architected instruction, and the instruction includes a negative zero control indicator that indicates whether negative zero control is enabled for execution of the instruction. In a particular example, the negative zero control indicator (NZ) is a bit included in the instruction text. The process then executes the instruction, e.g. by initially performing (604) the one or more operations using the input value to obtain a result that includes a sign. Performing the one or more operations can include setting the sign of the result. The result may be the output of the compute component (324 of FIG. 3), for instance, which is subject to zero sign control.

The process determines (606) whether the result has a zero magnitude. If not, then the process outputs (612) the signed result as part of the execution of the instruction. Otherwise (606, Y), the process determines (608) whether sign of the result is to be controlled, for instance forced positive. The determining is based at least in part on whether negative zero control is enabled or disabled, and therefore whether or not the negative zero control indicator (NZ) is set to a defined value. If negative zero control is enabled, for instance NZ is set to '1' to indicate enablement of negative zero control, then this enables output of negatively-signed zero results. Consequently, the sign of the zero-magnitude result (from 604) is not to be controlled to force it to be positive. The process proceeds by outputting (612) the zero-magnitude result with its sign, negative or positive. The negative zero control indicator NZ can be located in a field of the instruction, for instance. In some examples, determining whether to control the sign of the zero result is further based on a selected mode for execution of the instruction, for instance a selected sign operation of the instruction, the selected sign operation being selected by a field of the instruction. This has an advantage in that it enables forcing the sign of the result to occur or not depending on the selected sign operation to be performed by the instruction, thereby lending flexibility and selectivity to when a sign change is forced.

Based on the determining (i.e. 608), the process then performs further processing as part the executing the instruction. As noted, if it is determined at 608 that sign control to force a positive zero is not needed, for instance because negative zero control is enabled (NZ=1) such that both negative and positive results are enabled for output from the execution of the instruction, then the process outputs (612) the result having the sign set by the operation(s). Accordingly, the negative zero control indicator (NZ) being set to the defined value (e.g. '1') indicates that negative zero control is enabled for execution of the instruction. The determining (608) can determine, based on the negative zero control being enabled for execution of the instruction, not to control the sign of the numerical zero value result, and the further processing can therefore produce an output of execution of the instruction, the output including the numerical value zero having the sign. This has an advantage in that the sign provided as part of the zero result can be passed as output of the execution without forcing any particular (e.g. positive) sign. It provides an ability to selectively override an otherwise forced positive, to instead enable output of a negative zero. Otherwise, if at 608 it is determined that sign control is needed (608, Y), for instance because negative zero control is not enabled (NZ=0), and therefore outputting a negative zero is not permitted, the process forces (610) the sign of the zero result to positive (e.g. by unconditionally setting the sign to positive regardless of whether it was initially positive or negative), and outputs (612) that result having the forced-positive sign. Accordingly, the negative zero control indicator (NZ) being set to another value (e.g. '0'), different from the defined value of '1', indicates that negative zero control is not enabled for execution of the instruction. The determining (608) can determine, based on negative zero control not being enabled (NZ=0), to control the sign by forcing the sign of the numerical zero value to be positive, and the further processing can therefore produce an output of execution of the instruction by forcing the sign of the numerical value to be positive, where the output includes the numerical value zero having the forced positive sign. This has an advantage in that positive sign force can be selectively enabled when desired.

It is noted that by determining initially (606) whether the result has a zero magnitude, the determining (608) and the performing further processing (610/612) can be selectively performed or not performed (i.e. bypassed) depending on the outcome of inquiry 606. This has an advantage in that unnecessary processing can be avoided. Certain processing (for example emulation processing to emulate portions of behavior of an instruction in accordance with aspects described herein) can be bypassed, speeding execution time and efficiency, and saving computing resources when possible.

In particular examples, the setting of the sign of the zero result (i.e. as part of 604) sets the sign of the zero result to be negative, and the forcing (610) inverts the sign of the zero result to be positive. Alternatively, performing the operation(s) (604) could set the sign of a result instead to be positive, and the performing processing, which includes the forcing (610) in the case of controlling the sign (608, Y), makes no change to the positive sign and outputs the result with the positive sign.

In some embodiments, the input value is a binary coded decimal number, and an output of the further processing and the executing is a negative zero value in binary coded decimal format.

The process of FIG. 6A has an advantage in that it provides per-instruction control over a sign of a value output from the executing. Negative zero control can be selectively enabled or disabled on a per-instruction basis, providing the ability to avoid a situation where instruction processing might otherwise force a particular sign (e.g. positive) on a result even if that sign is improper or undesired.

In another exemplary embodiment, the zero-sign control as described herein is an enhancement to an instruction that delivers results having a sign already forced (e.g. to positive) from a negative sign. The NZ indicator can in this situation indicate whether possible 'correction' back to a negative sign is to be made. This embodiment may be useful in situations where a conventional instruction is configured to impose a positive sign on negative zero values and the NZ facility is implemented against that instruction so that its conventional processing is not modified, but rather the zero sign control takes as input the results that have already been subjected to sign inversion (e.g. to be positive) by the conventional processing and applies a correction (back to the negative sign) where appropriate. In this embodiment, the NZ indicator indicates whether or not a delivered zero result (having a positive sign) is to potentially to have its sign inverted to negative on the basis that the instructions computation(s) forced a positive sign to that zero value even though the zero is properly to be signed as negative (for instance in a complement sign operation against a positive zero). When NZ=1, that triggers an inquiry about whether to invert the sign of a negative zero result, which can take into account a particular sign operation for that instruction, for instance.

Now referring to FIG. 6B, depicting an example process associated with using the no validation control, the process obtains an instruction to perform one or more operations using at least one input value (620). The one or more operations can include specific computation(s) to be performed by the instruction, for instance data conversion, data movement, or a sign operation against an input value, as examples. The instruction is a single architected instruction, and the instruction includes a no validation indicator that can control whether digit validation check control is enabled for execution of the instruction. In a particular example, the no validation indicator (NV) is a bit included in the instruction text. Digit validation check control refers to control over what is indicated based on execution of the instruction insofar as a digit validation check is concerned. The no validation indicator can be located in a field of the instruction, for instance. An input value can include at least one binary coded decimal number for which digit validation checking is controlled in accordance with aspects described herein.

The process then executes the instruction, e.g. by determining (622), based on the no validation indicator, whether digit validation check control is enabled for execution of the instruction. In particular examples, this determining checks whether the validation indicator is set to 1, indicating that digit validation check control is enabled.

The process continues by performing processing based on the determining. Thus, based on determining that the digit validation check control is enabled (622, Y), e.g. by determining that no validation indicator (NV) is set to a defined value such as 1, the processing forces (624) a digit check error indicator output by the executing to indicate no digit check error with respect to the at least one input value. The digit check error indicator is, for instance, 322 of FIG. 3.

In particular examples, executing the instruction further includes performing a digit validation check on the at least one input value. The digit validation check is to validate whether the at least one input value includes numerical digits (e.g. 0-9) in defined positions and to output a result that indicates, based on that validating as part of the digit validation check, whether a digit check error exists with respect to the at least one input value. In particular examples, this is the output of the validation check 318 of FIG. 3, and is a result that may be nullified/suppressed if the digit validation check control is enabled for execution of the instruction. The output result of the digit validation check indicates whether or not a digit check error exists. However, based on the no validation indicator being set to the defined value, the processing can process that output result of the digit validation check to indicate no digit check error, regardless of whether the output result of the digit validation check indicates that a digit check error exists. In this regard, this forces the digit check error indicator to indicate no digit check error. In some examples, such as that depicted in FIG. 3, an AND gate unconditionally nullifies the result that is output from the digit validation check regardless of whether that digit check indicates 0 or 1 as its result. The output result of the digit validation check can be processed, referring to feeding that result into, e.g., an AND gate that also takes a false ('0') input, to produce a false ('0') output indicating no digit check error. In some examples, when the value '1' of the NV bit indicates digit validation check control is enabled and therefore no digit check error is to be indicated by the executing, the NV value of 1 is negated to 0 and fed as the false input to the AND gate to force its output to be false. The digit check error indicator output by the executing (e.g. 322) can therefore include the processed output result of the digit validation check, which processed output result indicates no digit check error. Thus, whether a digit check error is output from the overall execution of the instruction can be controlled even when a digit validation performed as part of instruction execution indicated that a digit check error does exist, i.e. even when some digits are indicated as being erroneous by the digit validation check, which has an advantage in that it provides an ability to selectively override the result delivered by the digit validation check when digits do not fall within a range expected by the digit validation check.

In some examples, the output of a digit validation check that is performed as part of executing the instruction is controlled by providing to the digit validation check an input that guarantees no digit check error is reported by the digit validation check. Based on the no validation indicator being set to the defined value to indicate digit validation check control is enabled, the processing can therefore include feeding a selected at least one predefined value, other than the at least one input value, as input into the digit validation check. The at least one predefined input can be selected based on the configuration of the digit validation check, i.e. based on the digit validation check being configured for its output result thereof to indicate no digit check error based on the predefined input value(s). The digit check error indicator output by the executing (e.g. 322) can therefore include that output result of the digit validation check indicating no digit check error on the basis of the preselected input value(s). This has an advantage in that it provides a way to control whether a digit check error is indicated without altering the output or operation of the validation check performed as part of executing the instruction.

In some instances, execution of the instruction proceeds in an emulated environment in which emulating the instruction's execution proceeds by executing particular code. Some of that code could emulate the digit validation check (318 of FIG. 3) of the instruction's typical processing. In these situations, execution of the particular code that emulates the digit validation check could be avoided or bypassed altogether when digit validation check control is enabled.

Thus, based on the no validation indicator being set to the defined value, a digit validation check on the at least one input value to validate whether the at least one input value includes numerical digits in defined positions is bypassed. This has an advantage in that a validation check can be avoided altogether, potentially providing an execution speed increase and resource consumption decrease, lending efficiencies to execution of code.

Also as noted, the processing can use the no validation indicator (NV) as an input to hardware (e.g. an AND gate) that sets the digit check error indicator (322) to indicate no digit check error. Such use could include, for instance, inverting the NV value '1' to a '0' which is then input to the AND gate to force a false ('0') output.

Referring back to the determining 622 of FIG. 6B, the defined value to enable digit validation check control can be a first value, and, based on the no validation indicator being set to a second value different from the first value, the digit validation check control is disabled and it is determined as such (622, N). In this case, the process could perform the digit validation check on the at least one input value that validates whether the at least one input value includes numerical digits (0-9) in defined positions and output (626) a result that indicates, based on the validation, whether a digit check error exists with respect to the at least one input value. It is noted that the digit validation check could be performed before or after the determining 622.

In any case, based on digit validation control not being enabled (622, N), the process proceeds from 626 by using (628), as the digit check error indicator output by the executing (i.e. 322 of FIG. 3), the result of the digit validation check. For instance, if digit validation check control is disabled, then whatever is the digit check error resulting from the digit validation check is used as the digit check error indicator (e.g. 322) output by the execution of the instruction.

The process of FIG. 6B has an advantage in that it provides per-instruction control over whether a digit validation check error is indicated by execution of the instruction. Indication of a digit check error can be selectively enabled or disabled on a per-instruction basis, providing the ability to convey no digit check error when a validation check otherwise would, or does, deliver a digit check error on the basis that an input digit is not in a range (e.g. 0-9) that is expected, though the digit is nonetheless valid. This is advantageous in situations where, for instance, an input digit is not a numerical (0-9) value but is instead a non-numerical encoding in the remaining range of values A through F.

Other variations and embodiments are possible.

Although various examples are provided, variations are possible without departing from a spirit of the claimed aspects.

Figure 7A:
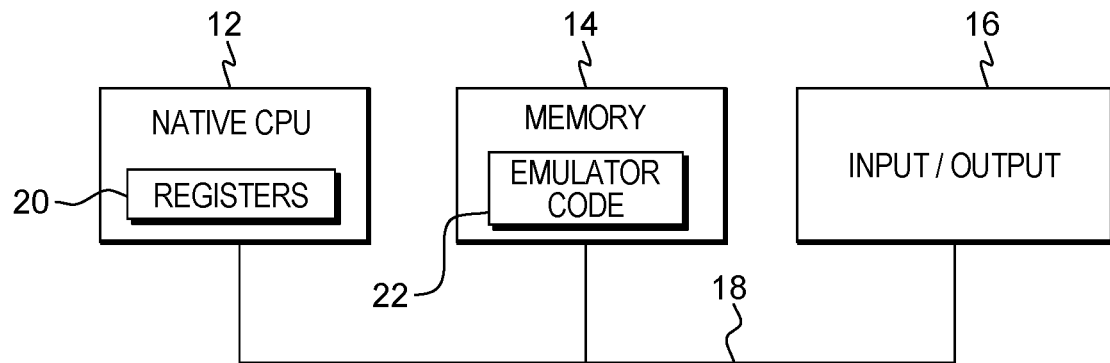
FIG. 7A depicts another example of a computing environment to incorporate and use aspects described herein.

Processes described herein may be performed singly or collectively by one or more computer systems, such as those described herein, and aspects described herein may be used by many types of computing environments. Another embodiment of a computing environment to incorporate and use one or more aspects of the present invention is described with reference to FIG. 7A. In this example, a computing environment 10 includes, for instance, a native central processing unit (CPU) 12, a memory 14, and one or more input/output devices and/or interfaces 16 coupled to one another via, for example, one or more buses 18 and/or other connections. As examples, computing environment 10 may include a PowerPC® processor offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel Corporation, Oracle, or others. IBM, z/Architecture, IBM Z, z/OS, PR/SM and PowerPC are trademarks or registered trademarks of International Business Machines Corporation in at least one jurisdiction. Intel and Itanium are trademarks or registered trademarks of Intel Corporation or its subsidiaries in the United States and other countries.

Native central processing unit 12 includes one or more native registers 20, such as one or more general purpose registers and/or one or more special purpose registers used during processing within the environment. These registers include information that represents the state of the environment at any particular point in time.

Moreover, native central processing unit 12 executes instructions and code that are stored in memory 14. In one particular example, the central processing unit executes emulator code 22 stored in memory 14. This code enables the computing environment configured in one architecture to emulate another architecture. For instance, emulator code 22 allows machines based on architectures other than the z/Architecture hardware architecture, such as PowerPC processors, HP Superdome servers or others, to emulate the z/Architecture hardware architecture and to execute software and instructions developed based on the z/Architecture hardware architecture.

Figure 7B:
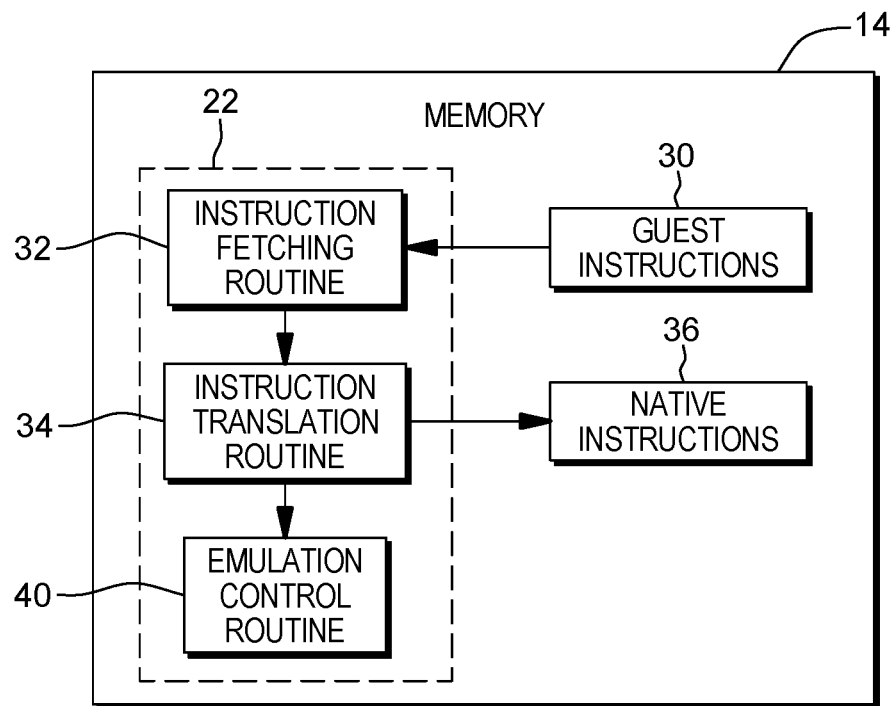
FIG. 7B depicts further details of the memory of FIG. 7A.

Further details relating to emulator code 22 are described with reference to FIG. 7B. Guest instructions 30 stored in memory 14 comprise software instructions (e.g., correlating to machine instructions) that were developed to be executed in an architecture other than that of native CPU 12. For example, guest instructions 30 may have been designed to execute on a processor based on the z/Architecture hardware architecture, but instead, are being emulated on native CPU 12, which may be, for example, an Intel Itanium II processor. In one example, emulator code 22 includes an instruction fetching routine 32 to obtain one or more guest instructions 30 from memory 14, and to optionally provide local buffering for the instructions obtained. It also includes an instruction translation routine 34 to determine the type of guest instruction that has been obtained and to translate the guest instruction into one or more corresponding native instructions 36. This translation includes, for instance, identifying the function to be performed by the guest instruction and choosing the native instruction(s) to perform that function.

Further, emulator code 22 includes an emulation control routine 40 to cause the native instructions to be executed. Emulation control routine 40 may cause native CPU 12 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 36 may include loading data into a register from memory 14; storing data back to memory from a register; or performing some type of arithmetic or logic operation, as determined by the translation routine.

Each routine is, for instance, implemented in software, which is stored in memory and executed by native central processing unit 12. In other examples, one or more of the routines or operations are implemented in firmware, hardware, software or some combination thereof. The registers of the emulated processor may be emulated using registers 20 of the native CPU or by using locations in memory 14. In embodiments, guest instructions 30, native instructions 36 and emulator code 22 may reside in the same memory or may be disbursed among different memory devices.

The computing environments described above are only examples of computing environments that can be used. Other environments, including but not limited to, non-partitioned environments, partitioned environments, and/or emulated environments, may be used; embodiments are not limited to any one environment.

Each computing environment is capable of being configured to include one or more aspects of the present invention. For instance, each may be configured to provide overflow processing, in accordance with one or more aspects of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
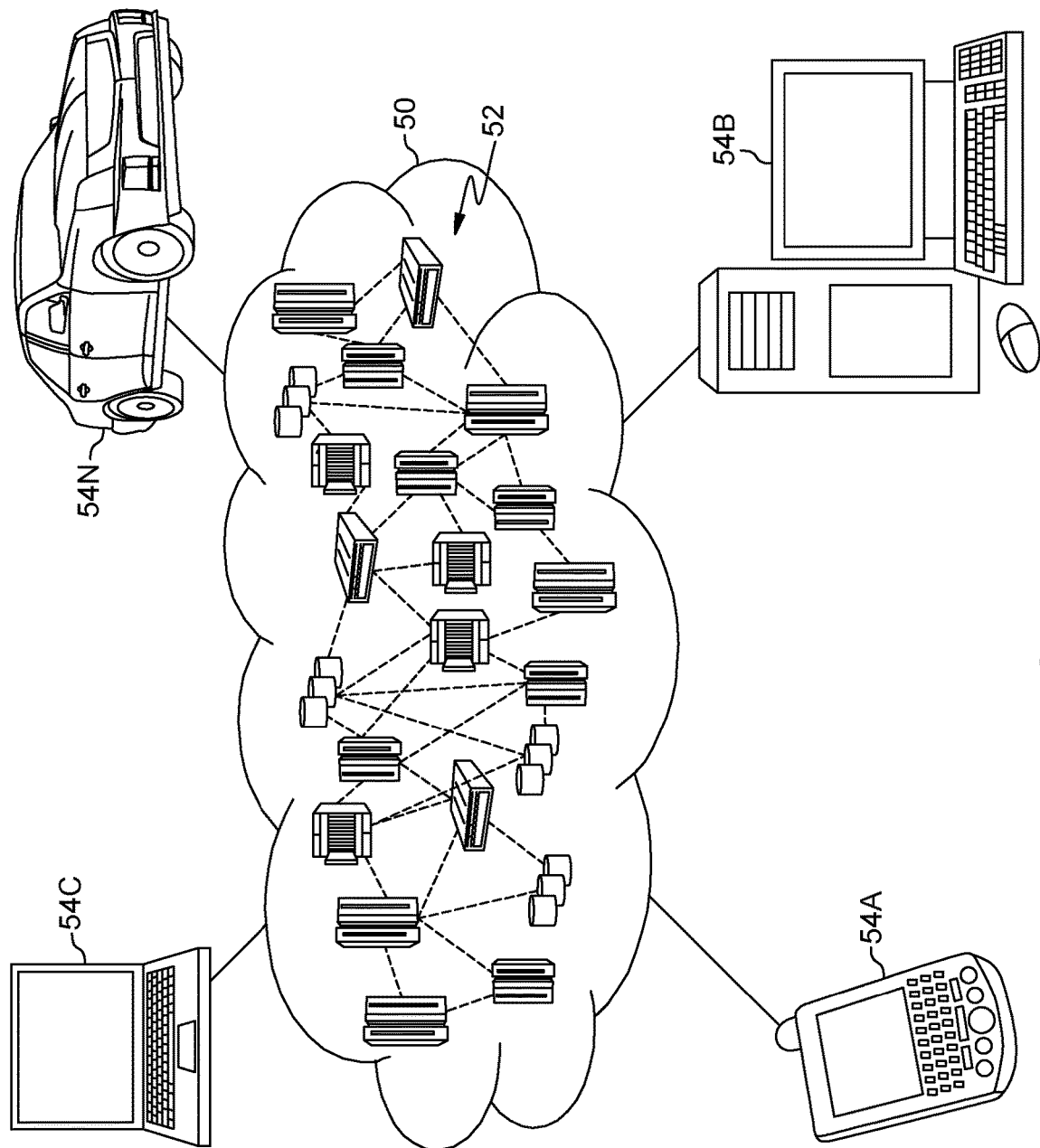
FIG. 8 depicts one embodiment of a cloud computing environment.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
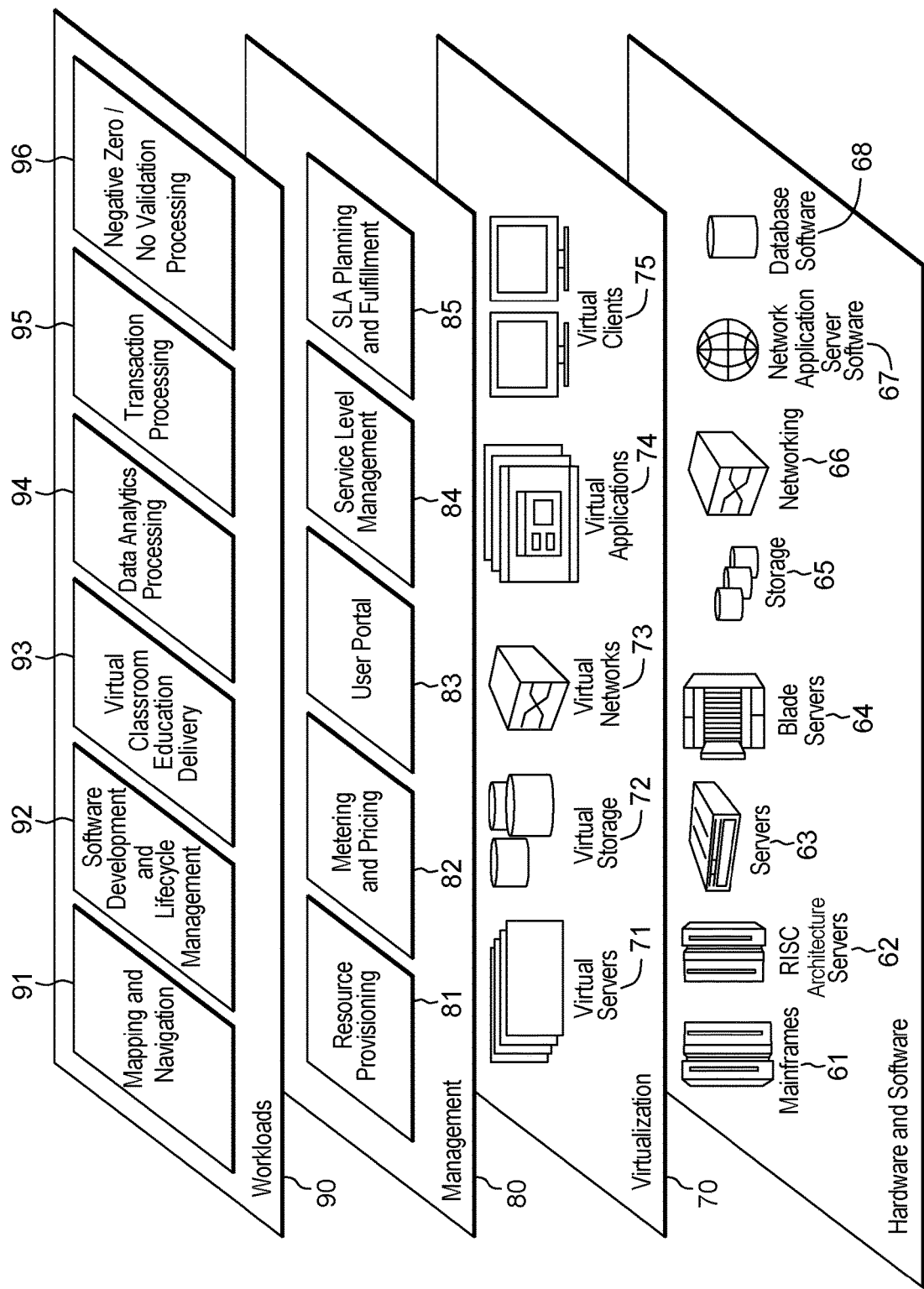
FIG. 9 depicts one example of abstraction model layers.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and negative zero/no validation processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
   a non-transitory computer readable storage medium readable by a processing circuit and storing instructions for performing a method comprising:
      obtaining an instruction to perform one or more operations using at least one input value, the instruction being a single architected instruction, and the instruction comprising a no-validation indicator for controlling whether digit validation check control is enabled for execution of the instruction; and
      executing the instruction, the executing comprising:
         determining, based on the no-validation indicator, whether digit validation check control is enabled for execution of the instruction; and
         performing processing based on the determining, wherein based on the no-validation indicator being set to a defined value, digit validation check control is enabled and the processing comprises forcing a digit check error indicator output by the executing to indicate no digit check error with respect to the at least one input value.

2. The computer program product of claim 1, wherein the executing further comprises performing a digit validation check on the at least one input value, the digit validation check to validate whether the at least one input value comprises numerical digits in defined positions and to output a result indicating, based on the validation, whether a digit check error exists with respect to the at least one input value.

3. The computer program product of claim 2, wherein based on the no-validation indicator being set to the defined value, the processing processes the output result of the digit validation check to indicate no digit check error, regardless of whether the output result of the digit validation check indicates that a digit check error exists.

4. The computer program product of claim 3, wherein the digit check error indicator output by the executing comprises the processed output result of the digit validation check indicating no digit check error.

5. The computer program product of claim 2, wherein, based on the no-validation indicator being set to the defined value, the processing further comprises feeding a selected at least one predefined value, other than the at least one input value, as input into the digit validation check, wherein the at least one predefined input is selected based on the digit validation check being configured for the output result thereof to indicate no digit check error, and wherein the digit check error indicator output by the executing comprises the output result of the digit validation check indicating no digit check error.

6. The computer program product of claim 1, wherein based on the no-validation indicator being set to the defined value, a digit validation check on the at least one input value to validate whether the at least one input value comprises numerical digits in defined positions is bypassed.

7. The computer program product of claim 1, wherein the at least one input value comprises at least one binary coded decimal number.

8. The computer program product of claim 1, wherein the no-validation indicator is located in a field of the instruction.

9. The computer program product of claim 1, wherein the performing processing uses the no-validation control indicator as an input to hardware that sets the digit check error indicator to indicate no digit check error.

10. The computer program product of claim 1, wherein the defined value is a first value, and wherein based on the no-validation indicator being set to a second value different from the first value, the digit validation check control is disabled and the processing comprises:
   performing a digit validation check on the at least one input value, the digit validation check to validate whether the at least one input value comprises numerical digits in defined positions and to output a result indicating, based on the validation, whether a digit check error exists with respect to the at least one input value; and
   using, as the digit check error indicator output by the executing, the result of the digit validation check.

11. A computer system for facilitating processing within a computing environment, the computer system comprising:
   a memory; and
   a processor coupled to the memory, wherein the computer system is configured to perform a method comprising:
      obtaining an instruction to perform one or more operations using at least one input value, the instruction being a single architected instruction, and the instruction comprising a no-validation indicator for controlling whether digit validation check control is enabled for execution of the instruction; and
      executing the instruction, the executing comprising:
         determining, based on the no-validation indicator, whether digit validation check control is enabled for execution of the instruction; and
         performing processing based on the determining, wherein based on the no-validation indicator being set to a defined value, digit validation check control is enabled and the processing comprises forcing a digit check error indicator output by the executing to indicate no digit check error with respect to the at least one input value.

12. The computer system of claim 11, wherein the executing further comprises performing a digit validation check on the at least one input value, the digit validation check to validate whether the at least one input value comprises numerical digits in defined positions and to output a result indicating, based on the validation, whether a digit check error exists with respect to the at least one input value.

13. The computer system of claim 12, wherein based on the no-validation indicator being set to the defined value, the processing processes the output result of the digit validation check to indicate no digit check error, regardless of whether the output result of the digit validation check indicates that a digit check error exists, and wherein the digit check error indicator output by the executing comprises the processed output result of the digit validation check indicating no digit check error.

14. The computer system of claim 12, wherein, based on the no-validation indicator being set to the defined value, the processing further comprises feeding a selected at least one predefined value, other than the at least one input value, as input into the digit validation check, wherein the at least one predefined input is selected based on the digit validation check being configured for the output result thereof to indicate no digit check error, and wherein the digit check error indicator output by the executing comprises the output result of the digit validation check indicating no digit check error.

15. The computer system of claim 11, wherein the at least one input value comprises at least one binary coded decimal number.

16. The computer system of claim 11, wherein the performing processing uses the no-validation control indicator as an input to hardware that sets the digit check error indicator to indicate no digit check error.

17. A computer-implemented method of facilitating processing within a computing environment, the computer-implemented method comprising:
  obtaining an instruction to perform one or more operations using at least one input value, the instruction being a single architected instruction, and the instruction comprising a no-validation indicator for controlling whether digit validation check control is enabled for execution of the instruction; and
  executing the instruction, the executing comprising:
    determining, based on the no-validation indicator, whether digit validation check control is enabled for execution of the instruction; and
    performing processing based on the determining, wherein based on the no-validation indicator being set to a defined value, digit validation check control is enabled and the processing comprises forcing a digit check error indicator output by the executing to indicate no digit check error with respect to the at least one input value.

18. The method of claim 17, wherein the executing further comprises performing a digit validation check on the at least one input value, the digit validation check to validate whether the at least one input value comprises numerical digits in defined positions and to output a result indicating, based on the validation, whether a digit check error exists with respect to the at least one input value.

19. The method of claim 18, wherein based on the no-validation indicator being set to the defined value, the processing processes the output result of the digit validation check to indicate no digit check error, regardless of whether the output result of the digit validation check indicates that a digit check error exists, and wherein the digit check error indicator output by the executing comprises the processed output result of the digit validation check indicating no digit check error.

20. The method of claim 18, wherein, based on the no-validation indicator being set to the defined value, the processing further comprises feeding a selected at least one predefined value, other than the at least one input value, as input into the digit validation check, wherein the at least one predefined input is selected based on the digit validation check being configured for the output result thereof to indicate no digit check error, and wherein the digit check error indicator output by the executing comprises the output result of the digit validation check indicating no digit check error.

* * * * *